(12) United States Patent
Brown et al.

(10) Patent No.: US 11,221,955 B2
(45) Date of Patent: Jan. 11, 2022

(54) METADATA TRACK SELECTION SWITCHING IN A DATA STORAGE SYSTEM

(71) Applicant: INTERNATIONAL BUSINESS MACHINES CORPORATION, Armonk, NY (US)

(72) Inventors: Theresa M. Brown, Tuson, AZ (US); David Fei, Tuscon, AZ (US); Gail Spear, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 16/123,486

(22) Filed: Sep. 6, 2018

(65) Prior Publication Data
US 2020/0081842 A1 Mar. 12, 2020

(51) Int. Cl.
*G06F 12/0868* (2016.01)
*G06F 3/06* (2006.01)
*G06F 12/0875* (2016.01)
*G06F 12/128* (2016.01)

(52) U.S. Cl.
CPC .......... *G06F 12/0868* (2013.01); *G06F 3/067* (2013.01); *G06F 3/0619* (2013.01); *G06F 3/0656* (2013.01); *G06F 12/0875* (2013.01); *G06F 12/128* (2013.01); *G06F 2212/1032* (2013.01); *G06F 2212/225* (2013.01); *G06F 2212/6046* (2013.01)

(58) Field of Classification Search
None
See application file for complete search history.

(56) References Cited

U.S. PATENT DOCUMENTS

| 4,611,314 | A | * | 9/1986 | Ogata | G06F 3/06 369/111 |
|---|---|---|---|---|---|
| 6,567,888 | B2 | | 5/2003 | Kedem | |
| 7,543,110 | B2 | | 6/2009 | Stolowitz | |
| 8,010,495 | B1 | | 8/2011 | Kuznetzov et al. | |
| 8,055,938 | B1 | | 11/2011 | Chatterjee et al. | |
| 8,533,397 | B2 | | 9/2013 | Bar-El et al. | |
| 8,549,225 | B2 | | 10/2013 | Blinick et al. | |
| 8,713,272 | B2 | | 4/2014 | Agombar et al. | |

(Continued)

OTHER PUBLICATIONS

U.S. Appl. No. 15/611,569, filed Jun. 1, 2017.

(Continued)

*Primary Examiner* — Stephanie Wu
(74) *Attorney, Agent, or Firm* — Konrad Raynes Davda & Victor LLP; William K. Konrad

(57) ABSTRACT

Metadata logic switches selection of a metadata track from multiple available metadata tracks in a volatile cache to fill the selected metadata track in a metadata track selection interval with metadata entries as source tracks of a source volume are copied to a backup volume of a copy relationship. Destage logic destages to storage a deselected metadata track containing metadata entries generated in a prior metadata track selection interval, while the metadata logic continues to generate and fill additional metadata entries in the selected metadata track in a concurrent metadata track selection interval. Other features and aspects may be realized, depending upon the particular application.

21 Claims, 9 Drawing Sheets

(56) References Cited

U.S. PATENT DOCUMENTS

| | | | |
|---|---|---|---|
| 8,850,106 | B2 | 9/2014 | Benhase et al. |
| 8,938,428 | B1 | 1/2015 | Ozekinci et al. |
| 9,471,499 | B2 | 10/2016 | Brown et al. |
| 9,558,072 | B1 | 1/2017 | Mam |
| 9,600,375 | B2 | 3/2017 | Dain et al. |
| 9,600,377 | B1 | 3/2017 | Cohen et al. |
| 9,626,115 | B2 | 4/2017 | Dain et al. |
| 9,658,798 | B2 | 5/2017 | Ash et al. |
| 9,733,862 | B1 | 8/2017 | Klemm et al. |
| 9,817,724 | B2 | 11/2017 | Dain et al. |
| 9,852,198 | B1 | 12/2017 | Kuznetzov et al. |
| 9,857,962 | B2 | 1/2018 | Yui et al. |
| 9,857,996 | B2 | 1/2018 | Wilkinson |
| 9,927,980 | B1 | 3/2018 | LeCrone et al. |
| 10,013,361 | B2 | 7/2018 | Mannenbach et al. |
| 2004/0243775 | A1* | 12/2004 | Coulter ............... G06F 11/1451 711/162 |
| 2005/0033755 | A1* | 2/2005 | Gokhale ............... G06F 3/0608 |
| 2005/0071372 | A1 | 3/2005 | Bartfai et al. |
| 2005/0171979 | A1 | 8/2005 | Stager et al. |
| 2005/0172074 | A1* | 8/2005 | Sinclair ................. G06F 1/3268 711/114 |
| 2006/0106891 | A1 | 5/2006 | Mahar et al. |
| 2008/0155216 | A1 | 6/2008 | Shoham |
| 2008/0222377 | A1 | 9/2008 | Wightwick et al. |
| 2010/0030978 | A1* | 2/2010 | Hada ........................ G09G 5/42 711/155 |
| 2011/0106804 | A1* | 5/2011 | Keeler .................... G06F 3/061 707/737 |
| 2014/0108756 | A1 | 4/2014 | Brown et al. |
| 2014/0201442 | A1* | 7/2014 | Rajasekaran ....... G06F 12/0804 711/119 |
| 2014/0281257 | A1* | 9/2014 | Hochberg ............... G06F 3/065 711/135 |
| 2014/0344526 | A1 | 11/2014 | Brown et al. |
| 2015/0081628 | A1 | 3/2015 | Brown et al. |
| 2015/0261678 | A1 | 9/2015 | Gupta et al. |
| 2015/0286424 | A1 | 10/2015 | Dain et al. |
| 2015/0286432 | A1 | 10/2015 | Dain et al. |
| 2015/0286542 | A1 | 10/2015 | Dain et al. |
| 2016/0162421 | A1* | 6/2016 | Xiong ................... G06F 13/385 710/52 |
| 2016/0232102 | A1 | 8/2016 | Ash et al. |
| 2016/0253121 | A1 | 9/2016 | Guo et al. |
| 2016/0259574 | A1 | 9/2016 | Carpenter et al. |
| 2016/0291890 | A1 | 10/2016 | Jennas et al. |
| 2017/0017419 | A1* | 1/2017 | Matthews ............. G06F 12/023 |
| 2017/0153950 | A1 | 6/2017 | Iwasaki et al. |
| 2017/0161153 | A1 | 6/2017 | Dain et al. |
| 2017/0177443 | A1 | 6/2017 | Figueroa et al. |
| 2017/0315740 | A1* | 11/2017 | Corsi ................. G06F 13/4282 |
| 2018/0136874 | A1 | 5/2018 | Karve et al. |
| 2018/0150229 | A1 | 5/2018 | Brown et al. |
| 2019/0042472 | A1* | 2/2019 | Branco ................... G06F 21/79 |

OTHER PUBLICATIONS

U.S. Appl. No. 15/663,727, filed Jul. 29, 2017.
U.S. Appl. No. 15/828,288, filed Nov. 30, 2017.
U.S. Appl. No. 15/828,302, filed Nov. 30, 2017.
Azagury et al.; "Point-In-Time Copy: Yesterday, Today And Tomorrow", IBM Storage Systems Group, 2002, pp. 259-270.
Anonymous, "Data Aware Optimized Backups—Object & System Level", dated Jun. 2, 2016, An IP.com Prior Art Database Technical Disclosure, IPCOM000246384D, Total 7 pages.
IBM, "Data Protection Manager for Exchange 2010 and the IBM® Storwize® V7000 with SAN Based Replica Creation and Recovery" Installation and Configuration Guide, dated Jul. 2011, Version: 2.7.4,Total 44 pages.
Dufrasne et al., "IBM DS8880 Architecture and Implementation (Release 8.3)", IBM, Nov. 2017, Total 510 pp.
EMC et al., "Introduction To XtremIO Virtual Copies", White Paper, Part No. H13035-01 (Rev. 02), Mar. 2016, pp. 1-39.
Brooks et al., "IBM Tivoli Storage Manager for Advanced Copy Services" dated Dec. 2006, International Technical Support Organization, Total 318 pages.
Lim, S. et al., "Efficient Journaling Writeback Schemes for Reliable and High-Performance Storage Systems", Pers Ubiquit Comput, 17, 2013, 14 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Sep. 2011, Computer Security Division Information Technology Laboratory National Institute of Standards and Technology, Total 7 pp.
Anonymous, "Method for Enhanced Application Performance During FlashCopy Restore in Multi-tier Storage Environment", dated Nov. 28, 2017, An IP.com Prior Art Database Technical Disclosure, IPCOM000251706D, Total 8 pages.
Taylor, Chris; "Effective Backups: Selecting The Right Backup Mechanism To Match The Business Requirement", Session 16273, pp. 1-62, 2014.
Anonymous, "Tweak Modification to Improve Reliability and Durability in an Encrypted Flash Based Back-Up System" dated Jan. 25, 2017, An IP.com Prior Art Database Technical Disclosure, IPCOM000248984D, Total 4 pages.
Wu, et al., "LDM: Log Disk Mirroring with Improved Performance and Reliability for SSD-Based Disk Arrays", ACM Transactions on Storage, vol. 12, No. 4, Article 22, May 2016, 21 pp.
Yang et al.; "TRAP-Array: A Disk Array Architecture Providing Timely Recovery to Any Point-in-time," 33rd International Symposium on Computer Architecture (ISCA'06), Boston, MA, 2006, pp. 289-301.
Wikipedia, "Binary Search Algorithm", [online], edited on Aug. 14, 2018. Retrieved from the Internet at: <URL: https://en.wikipedia.org/w/index.php?title=Binary_search_algorithm&oldid=854879077>, Total 8 pp.
U.S. Appl. No. 16/123,660, filed Sep. 6, 2018.
U.S. Appl. No. 16/123,412, filed Sep. 6, 2018.
U.S. Appl. No. 16/123,674, filed Sep. 6, 2018.
U.S. Appl. No. 16/123,635, filed Sep. 6, 2018.
U.S. Appl. No. 16/123,457, filed Sep. 6, 2018.
U.S. Appl. No. 16/123,618, filed Sep. 6, 2018.
U.S. Appl. No. 16/123,771, filed Sep. 6, 2018.
U.S. Appl. No. 16/123,445, filed Sep. 6, 2018.

\* cited by examiner

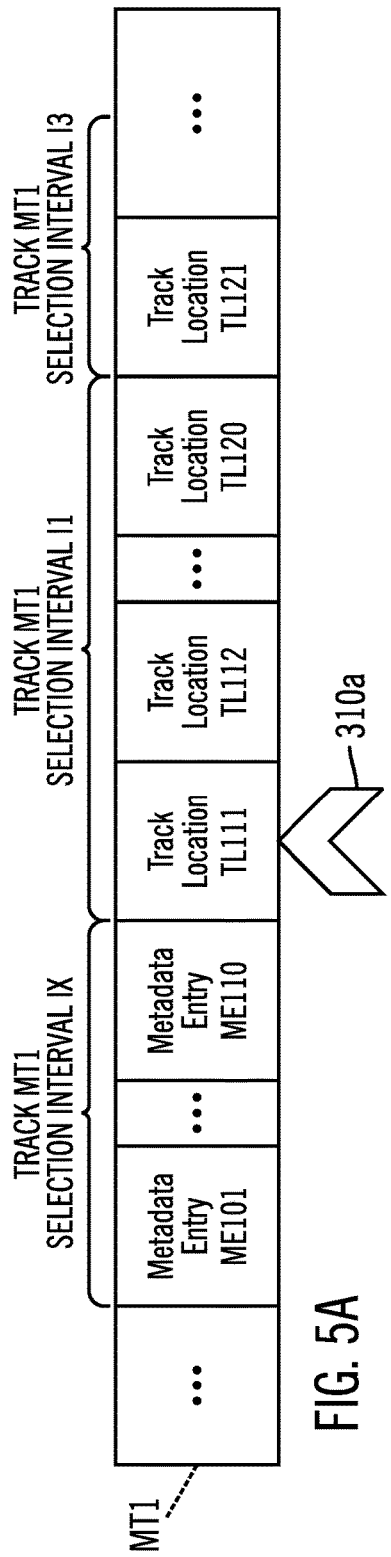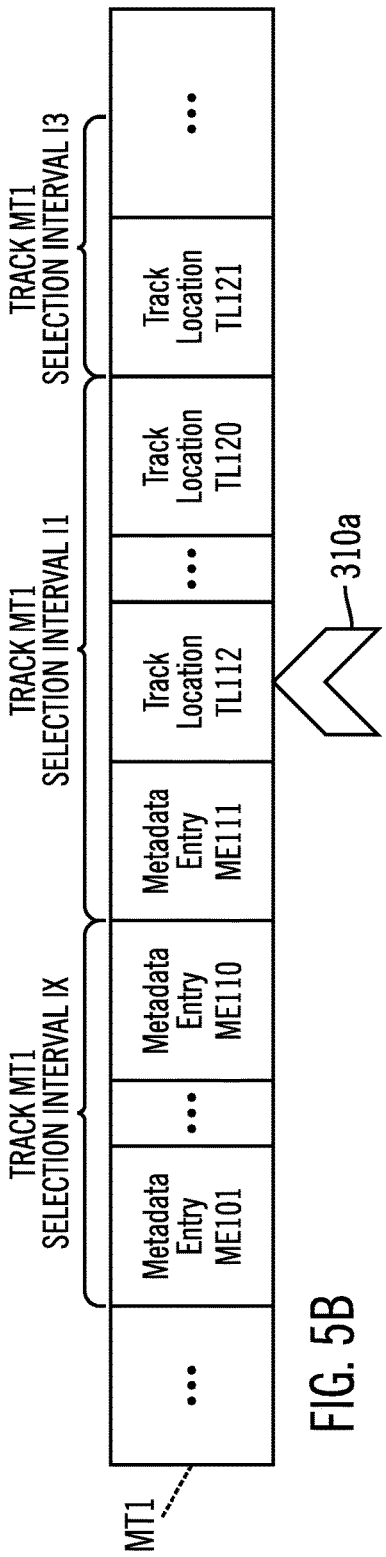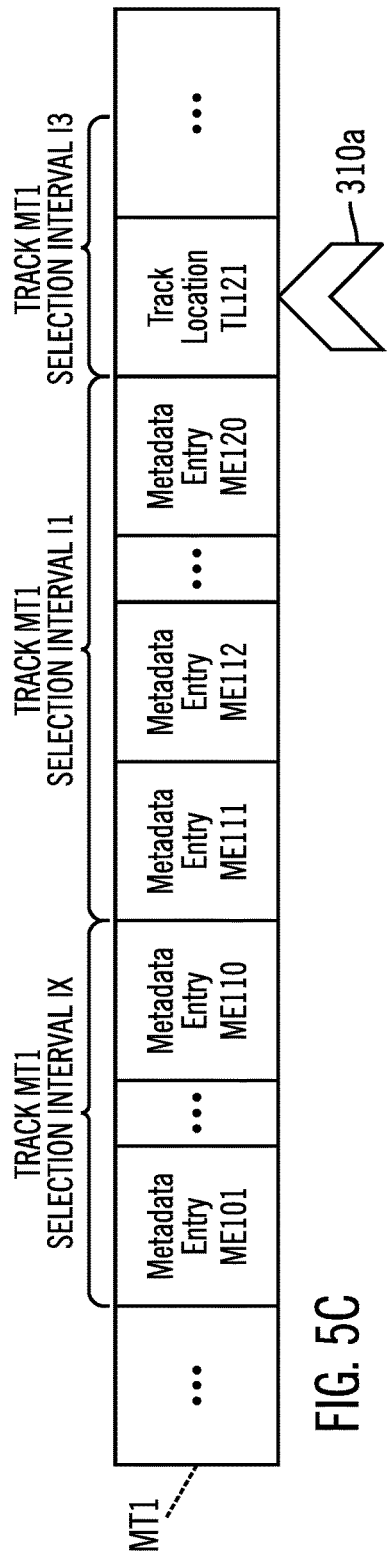
FIG. 5A
FIG. 5B
FIG. 5C

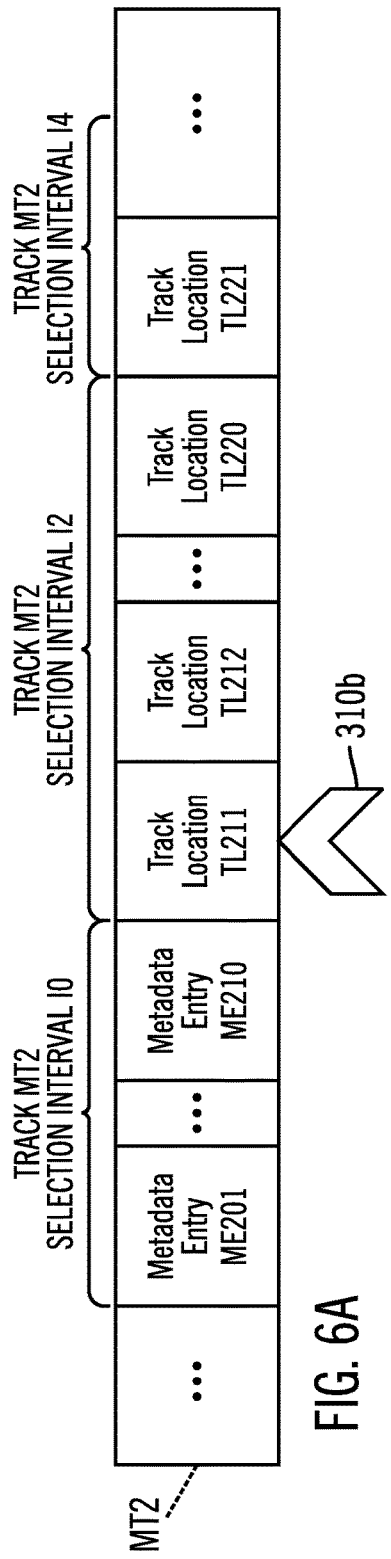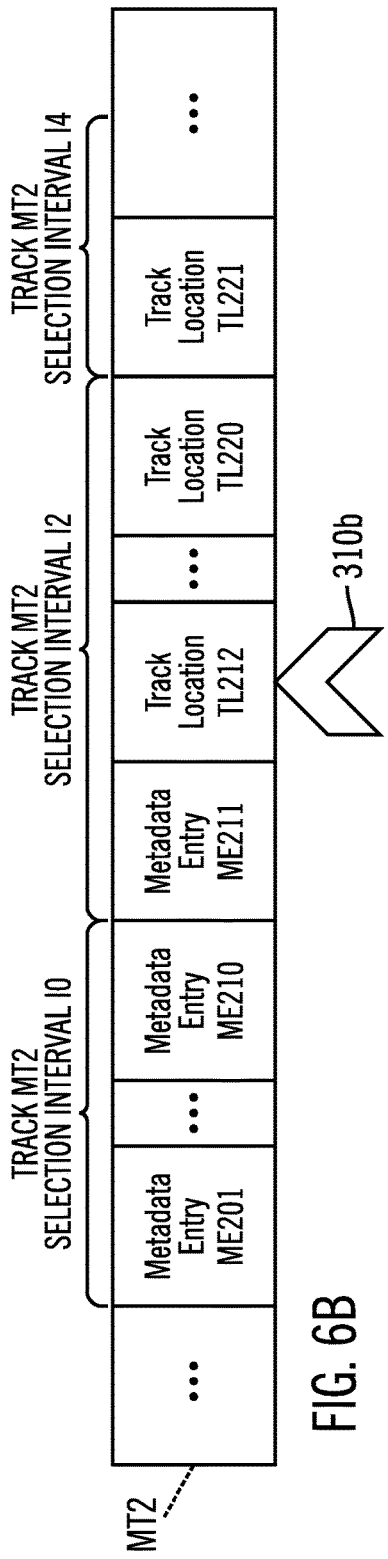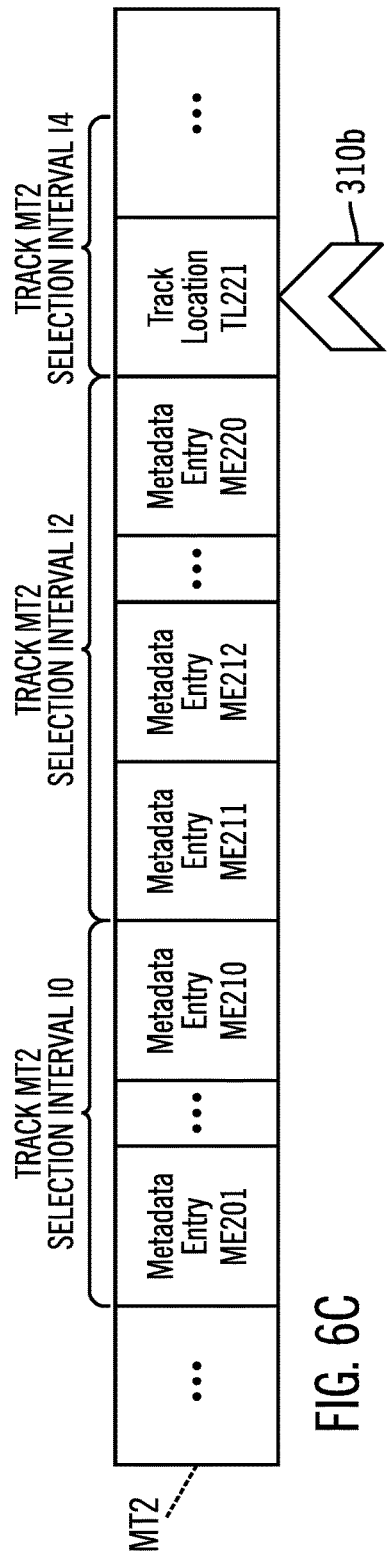
FIG. 6A
FIG. 6B
FIG. 6C

METADATA TRACK SELECTION SWITCHING IN A DATA STORAGE SYSTEM

BACKGROUND OF THE INVENTION

1. Field of the Invention

The present invention relates to a computer program product, system, and method for metadata track selection switching in data storage systems.

2. Description of the Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship. Primary and secondary storage controllers may be used to control access to the primary and secondary storage devices.

Depending upon the distance between primary and secondary storage systems, data may be synchronously or asynchronously copied from the primary storage site to the secondary storage site. Data may be copied in consistency groups, such that the second copy at the secondary site is consistent as of a point in-time to a first copy of the data at the primary site. In a consistency group, the order of dependent writes is preserved in the copying of the data.

The second copy at the secondary site, may be copied to a target or backup copy of the data at the secondary site using a point-in-time ("PiT") copy technique, such as the IBM FlashCopy® (FlashCopy is a registered trademark of IBM). In this way the second copy at the secondary site becomes the source data for the PiT copy to the backup copy which is typically on the same storage as the second copy.

In a PiT copy, the source data need not be physically copied from the source volume to the backup volume as long as the source data as it existed at the particular point-in-time still remains on the source volume. Instead, for each track of the backup volume, metadata may point to the particular source track of the source volume where the source data may be obtained if needed such in a read operation directed to the track of the backup volume. However, if the source data of a particular source track will be overwritten by an update operation directed to the source track, the source data of the source track is copied to the corresponding target track of the backup volume before the source track is overwritten with the update data.

Another copy technique referred to herein as a multi-point-in-time (MPiT) copy technique provides a copy of a source volume which spans multiple consistency groups. An example of an MPiT copy technique is the IBM "Safeguarded Copy" function. An MPiT copy function typically relies on metadata to provide information on where in the MPiT backup volume, a particular time version of a particular track of the source volume of the MPiT copy function resides. This metadata is referred to herein as Source Track ID Descriptor or STIDD. Within the STIDD metadata are multiple metadata tracks, and within each metadata track are multiple STIDD entries, each of which points to the location in a backup volume of a particular time version of a particular source track.

When tracks are copied from the MPiT Source to the MPiT Backup Volume, typically because a source track is being updated, STIDD entries are typically created in cache for each track being copied before the source track is overwritten by the update. Because the cache is typically a volatile memory, the STIDD entries in cache may be lost in the event of a power loss or hardware or software failure. Accordingly, the MPiT copy may not be deemed to be complete until all STIDD metadata entries of a full metadata track are safely destaged to nonvolatile storage. The filling of a metadata track with metadata entries is typically interrupted at multiple points for destaging. As the metadata track is destaged, it is unavailable for further filling until the destaging is complete. Once the destaging is completed, the filling of the track with additional metadata track entries resumes until the next destaging of the track. Thus, a metadata track is typically destaged at multiple points as it is filled with metadata track entries until the track is full. Once the track is full, it is destaged a last time.

It is appreciated that the more frequently a metadata track and its STIDD metadata entries in cache are preserved by destaging them to permanent storage, the less likely it is that an STIDD metadata entry will be lost due to a cache failure. On the other hand, if the metadata track which contains the STIDD entries is destaged to permanent storage each time a metadata entry is added to the track, the performance of the system may be significantly impacted. For example, a metadata track being destaged to nonvolatile storage is typically unavailable to receive new metadata entries. Thus, the filling of the metadata track with new entries does not resume until each destaging operation is completed.

In order to reduce the frequency of metadata destaging operations to reduce the impact of destaging operations on system performance, it is known to generate journal entries which are stored in nonvolatile cache. Each journal entry provides sufficient information to reconstruct a metadata entry which has not yet been destaged in the event metadata entries in cache are lost prior to destaging. Accordingly, the frequency of destaging of metadata tracks may be safely decreased to increase system performance because the information needed for error recovery is preserved in the journal entries stored in nonvolatile cache. Once the metadata track is safely destaged, any corresponding journal entries in the nonvolatile cache may be released.

However, it is appreciated that the number of journal entries should be limited to facilitate the reconstruction of metadata entries so that the error recovery may proceed quickly. Conversely, limiting the number of journal entries in nonvolatile cache can cause a corresponding increase in the frequency of destaging of metadata tracks of entries as the limit in number of journal entries is reached more quickly. Thus system designers have been faced with a tradeoff between reducing error recovery time by reducing the number of journal entries in cache, and the resultant cost of such error recovery time reduction in terms of a reduction in system performance caused by increasing the frequency of destaging operations to limit the number of journal entries.

SUMMARY

Metadata track selection switching in accordance with the present description provides a significant improvement in computer technology. For example, metadata track selection switching in accordance with the present description permits the number of journal entries to be limited without incurring a wait for access while a metadata track is being destaged. Thus, system designers of a system employing metadata track selection switching in accordance with the present description, can reduce error recovery time by reducing the number of journal entries in cache by increasing the frequency of destaging operations to limit the number of journal entries without a significant impact on system performance.

In one aspect of the present description, as data tracks are copied from a source volume to a backup volume, a first plurality of source track identification descriptor (STIDD) metadata entries are generated for each of a first plurality of copied tracks and the first plurality of generated metadata entries are stored in a first selection interval in a selected first metadata track which was selected from a plurality of available metadata tracks in cache, for example. In one embodiment, selection of a metadata track is switched from the first metadata track to a second metadata track such that the second metadata track is the selected track and the first metadata track is deselected. As a result, the deselected first metadata track storing the first plurality of generated metadata entries may be destaged to non-volatile storage, while a second plurality of source track identification descriptor (STIDD) metadata entries is generated for each of a second plurality of copied tracks and is stored in a second selection interval in the selected second metadata track without waiting for the destaging of the first metadata track to complete. In this manner, a metadata track may be destaged to non-volatile storage without causing a significant delay in the generation of new metadata entries in a volatile cache, thereby providing a significant improvement in computer technology.

In another aspect of metadata track selection switching in accordance with the present description, a position of a cursor pointing to a STIDD metadata entry position of the selected first metadata track may be incremented as STIDD metadata entries are stored in the selected first metadata track. Further, a current position of the cursor in connection with deselecting the first metadata track may be stored as the metadata entry filling is switched to the second track. Accordingly, the stored cursor position of the first metadata track may be used to facilitate resuming metadata entry filling at the stored cursor position as metadata entry filling switches back to the first metadata track. In this manner, the storing of another plurality of generated metadata entries in the selected first metadata track may be readily initiated at an STIDD metadata entry position of the selected first metadata track pointed to by the stored cursor position.

In another aspect, a first plurality of journal entries may be created corresponding to the generated first plurality of source track identification descriptor (STIDD) metadata entries for each of the first plurality of copied tracks and the journal entries may be released from cache upon completion of the destaging of the deselected first metadata track. In this manner, the number of journal entries stored in cache may be reduced by increasing the rate of destaging of metadata tracks without significantly adversely impacting system performance.

In still another aspect, switching selection of a metadata track from the first metadata track to the second metadata track occurs in response to the first plurality of source track identification descriptor (STIDD) metadata entries stored on the first metadata track reaching in a track selection interval, a predetermined limit less than full capacity of the first metadata track or the first track has become full, which ever occurs first. In a similar manner, the switching selection of a metadata track from the second metadata track back to the first metadata track occurs in response to the second plurality of source track identification descriptor (STIDD) metadata entries stored on the second metadata track reaching in a track selection interval, a predetermined limit less than full capacity of the second metadata track or the second track has become full, which ever occurs first. The switching back and forth between filling the first track and filling the second track continues until a track reaches full capacity. At that point, filling switches to a new track and switching resumes.

As a result, in one embodiment, the number of journal entries stored in each current metadata track selection interval and the frequency of destaging operations of deselected metadata tracks, are each a function of the limit on the number of metadata entries generated and placed in a current metadata track selection interval. It is appreciated that the smaller the limit on the number of metadata entries during each current metadata track selection interval, the smaller the number of journal entries stored and the greater the frequency of switching the filling of metadata tracks between available metadata tracks and the greater the frequency of destaging of the deselected metadata tracks. However, because metadata track selection switching in accordance with the present description permits the frequency of destaging of deselected tracks to be increased without a significant adverse affect on system performance, the number of journal entries may be reduced to reduce error recovery time without a significant impact on system performance due to the increase in the rate of destaging operations.

Implementations of the described techniques may include hardware, a method or process, or computer software on a computer-accessible medium. Other features and aspects may be realized, depending upon the particular application.

BRIEF DESCRIPTION OF THE DRAWINGS

FIGS. 5A-5C illustrate a first metadata track of the computing environment of FIG. 1, being filled with metadata track entries.

FIGS. 6A-6C illustrate a second metadata track of the computing environment of FIG. 1, being filled with metadata track entries.

DETAILED DESCRIPTION

Figure 1:
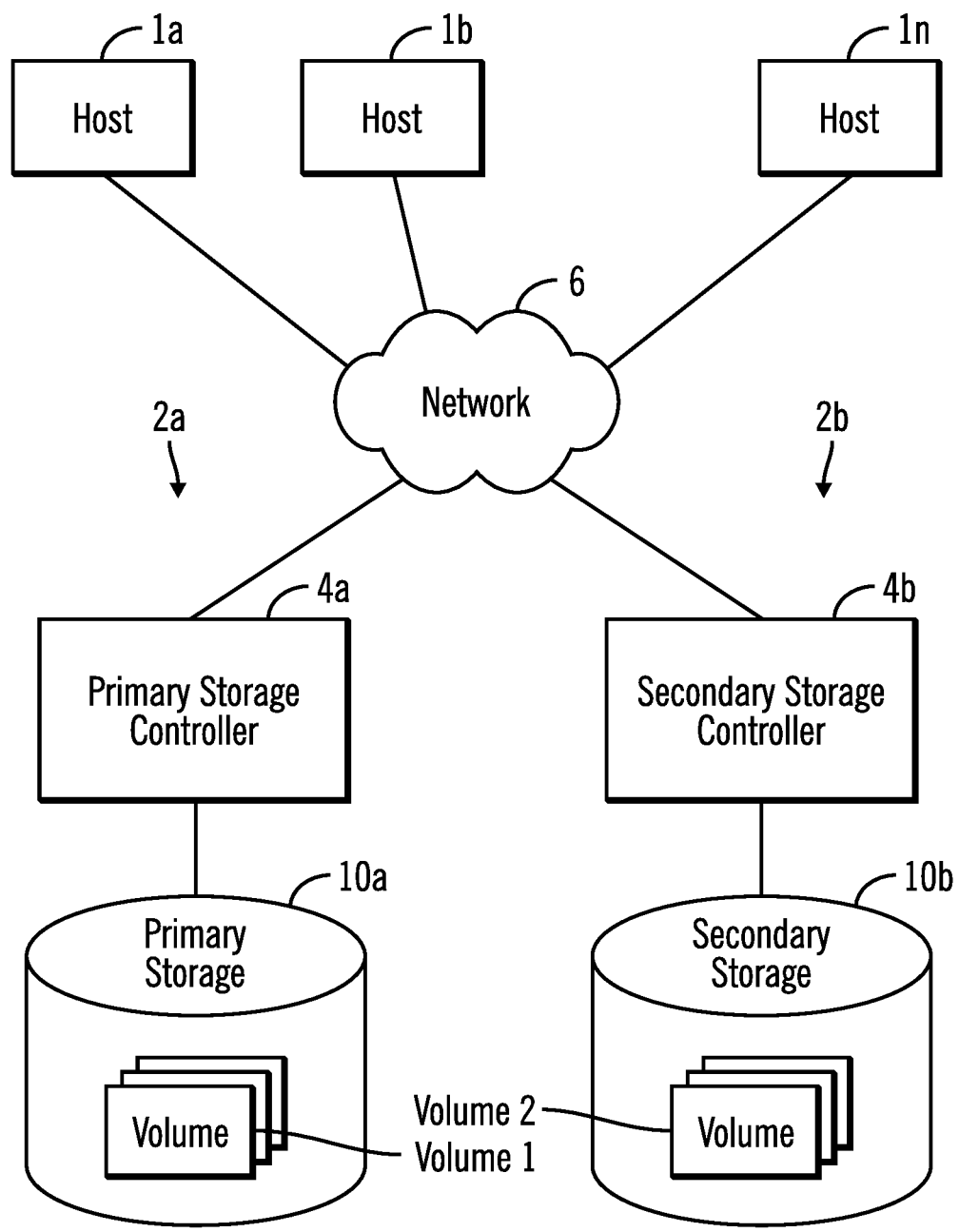
FIG. 1 illustrates an embodiment of a computing environment employing metadata track selection switching in a data storage system in accordance with one aspect of the present description.

As noted above, system designers have been faced with a tradeoff between reducing error recovery time in a data storage system by reducing the number of journal entries in cache, and the resultant cost of such error recovery time reduction in terms of a reduction in system performance caused by increasing the frequency of destaging operations to limit the number of journal entries. It is appreciated herein that there is a need to limit journal entries without incurring a wait for access while the metadata track is being destaged.

Metadata track selection switching in accordance with the present description provides a significant improvement in computer technology. For example, metadata track selection switching in accordance with the present description allows journal entries to be limited without incurring a wait for access while the metadata track is being destaged. Thus, system designers of a system employing metadata track selection switching in accordance with the present description, can reduce error recovery time by reducing the number of journal entries in cache by increasing the frequency of destaging operations to limit the number of journal entries without a significant impact on system performance. As a result, a significant improvement in computer technology is provided.

In one aspect of the present description, the metadata logic selects from multiple available metadata tracks in a volatile cache, a metadata track to fill with STIDD metadata entries in a track selection interval as source tracks of a source volume are copied to a backup volume of an MPiT copy relationship. As metadata entries are generated and placed in the selected metadata track in the volatile cache for each of the copied source tracks, journal logic creates journal entries corresponding to the generated STIDD metadata entries and stores them in a nonvolatile cache.

In one aspect of the present description, the metadata logic switches at an appropriate time, selection of a metadata track from a first selected metadata track in a first selection interval to a second metadata track in a second selection interval. In this manner, the second metadata track of the available tracks becomes the current selected track of the current selection interval and the first metadata track becomes deselected. Destage logic destages the deselected first metadata track containing generated metadata entries to storage while the metadata logic continues to generate additional source track identification descriptor (STIDD) metadata entries for each track of the source volume being copied to the backup volume. However, at this point following the switch of the selected metadata track to the second metadata track, the generated metadata entries are placed in the second selection interval in the second, selected metadata track instead of the first deselected metadata track. As metadata entries are generated and placed in the selected second metadata track in the volatile cache for each of the copied source tracks, journal logic creates journal entries corresponding to the generated STIDD metadata entries of the second, selected metadata track and stores them in the nonvolatile cache. The journal logic frees or releases the portion of the journal entries in the nonvolatile cache for the deselected metadata track upon completion of the destaging of the deselected first metadata track to storage.

In this manner, the first, deselected track may be destaged to nonvolatile storage to ensure preservation of the metadata entries of the first, deselected metadata track while new metadata entries continue to be generated and placed in the second, selected metadata track in the volatile cache as source tracks continue to be copied to the backup volume. As a result, a metadata track may be destaged to nonvolatile storage without causing a significant delay in the generation of new metadata entries in the volatile cache.

Moreover, the number of journal entries in the nonvolatile cache may be reduced to reduce error recovery time should the journal entries be needed to reconstruct lost metadata entries without causing a significant adverse impact on system performance. Instead, because multiple metadata track selection switching in accordance with the present description permits a metadata track to be destaged to nonvolatile storage without causing a significant delay in the generation of new metadata entries in the volatile cache, the frequency of destaging operations may be increased to reduce the number of journal entries without causing a significant impact on system performance. Thus system designers are no longer faced with a tradeoff between reducing error recovery time by reducing the number of journal entries in cache, and a resultant cost of such error recovery time reduction in terms of reducing system performance.

At an appropriate time, the metadata logic will again switch selection of the metadata tracks so that the first metadata track is again the selected metadata track in a track selection interval and the second metadata track is again the deselected metadata track. In this manner, the second, deselected track may be destaged to nonvolatile storage to ensure preservation of the metadata entries of the second metadata track while new metadata entries continue to be generated and placed in another selection interval in the first, selected metadata track as source tracks continue to be copied to the backup volume.

As metadata entries are generated and placed in the first, selected metadata track in the volatile cache for each of the copied source tracks, journal logic creates journal entries corresponding to the generated STIDD metadata entries and stores them in the nonvolatile cache. In addition, the journal logic releases that portion of the journal entries for the second, deselected metadata track in the nonvolatile cache upon completion of the destaging of the second, deselected metadata track. Here too, metadata track selection switching in accordance with the present description permits a metadata track to be destaged to nonvolatile storage without causing a significant delay in the generation of new metadata entries in the volatile cache because metadata entries may be added to one track while the other track is being destaged and then switching the roles of the two tracks until the two tracks are filled to capacity and destaged.

Implementations of the described techniques may include hardware, a method or process, or computer software on a computer-accessible medium. A system of one or more computers may be configured for metadata track selection switching in a data storage system in accordance with the present description, by virtue of having software, firmware, hardware, or a combination of them installed on the system that in operation causes or cause the system to perform metadata track selection switching in accordance with the present description. For example, one or more computer programs may be configured to perform metadata track selection switching in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIGS. 1-4 illustrate an embodiment of a computing environment employing metadata track selection switching in a data storage system in accordance with the present description. A plurality of hosts 1a (FIGS. 1, 2), 1b . . . 1n may submit Input/Output (I/O) requests over a network 6 to one or more data storage devices or systems 2a, 2b, to read or write data. The hosts 1a, 1b . . . 1n may be separate physical devices or may be virtual devices implemented using assigned resources of partitions of a server, for example. In a similar manner, the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

Figure 2:
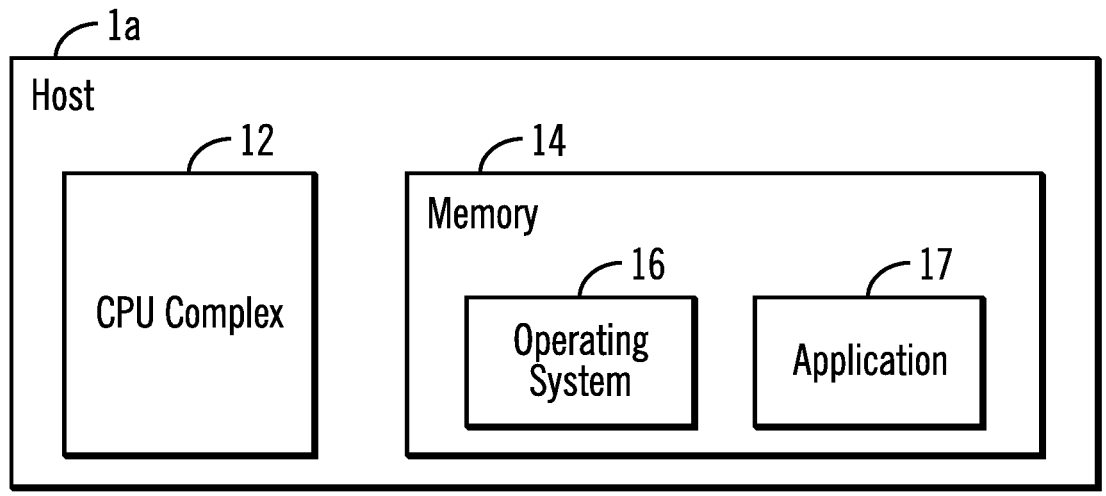
FIG. 2 illustrates an example of a host of the computing environment of FIG. 1.

A typical host as represented by the host 1a of FIG. 2 includes a CPU complex 12 and a memory 14 having an operating system 16 and an application 17 that cooperate to read data from and write data updates to the storage 10a, 10b via a storage controller 4a, 4b. An example of a suitable operating system is the z/OS operating system. It is appreciated that other types of operating systems may be employed, depending upon the particular application.

Figure 3:
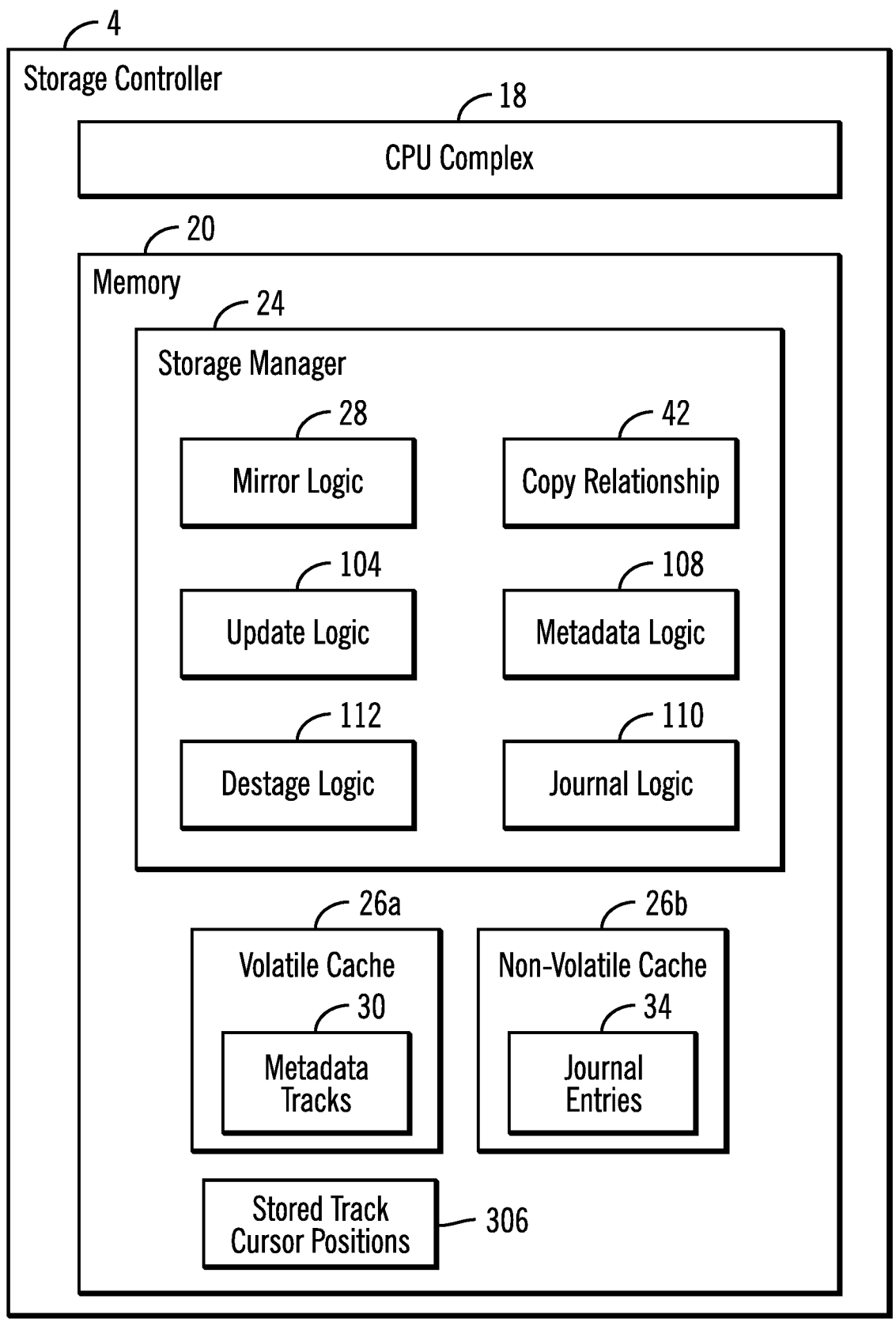
FIG. 3 illustrates an example of a storage controller of the computing environment of FIG. 1.

Each data storage system 2a, 2b includes a storage controller or control unit 4a, 4b, respectively, an example of which is shown in greater detail in FIG. 3 as storage controller 4, which accesses user data and metadata stored in multiple data storage units of storage 10a, 10b, respectively. Each storage controller 4 (FIG. 3), 4a, 4b includes a CPU complex 18 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 3), 4a, 4b further has a memory 20 that includes a storage manager 24 configured to manage storage operations including writing data to or reading data from a storage unit of an associated storage 10a, 10b in response to an I/O data request from a host or mirrored data from another data storage system. The storage manager 24 includes appropriate storage device drivers to configure associated storage 10a, 10b.

A cache comprising a volatile cache 26a, and a non-volatile cache 26a of the memory 20 may comprise one or more of different types of memory, such as RAMs, write caches, read caches, non-volatile storage (NVS), etc. The different types of memory that comprise the cache may interoperate with each other. The CPU complex 18 of each storage controller 4 (FIG. 3), 4a, 4b may have multiple clusters of processors, each cluster having its own assigned memory 20, storage manager 24, cache, etc. The processing and memory resources assigned each cluster may be physical, virtual, shared, transferable or dedicated, depending upon the particular application. In one embodiment, metadata entries being generated may be placed in tracks 30 of the volatile cache 26a and journal entries 34 being generated may be journaled in the non-volatile cache 26a.

In the illustrated embodiment, the storage manager 24 includes mirror logic 28 that is configured to execute in the primary storage controller 4a (FIG. 1) and perform copy operations to copy tracks or other portions of storage volumes from the primary storage controller 4a to the secondary storage controller 4b in a consistent manner. For example, a primary-secondary pair of volumes, volume1, volume2 are in an asynchronous copy or mirror relationship 42 such that updates to the primary volume1 are asynchronously mirrored to each secondary volume2. Although one example of metadata track selection switching is described in connection with protecting a mirrored source or a mirrored target, it is appreciated that metadata track selection switching in accordance with the present description may be used in connection with generation, journaling or destaging of metadata tracks for other types of copying functions such as PiT functions and any other function involving metadata tracks. Thus, in one embodiment, metadata track selection switching in accordance with the present description is a stand-alone function.

In the illustrated embodiment, a copy relationship is represented by a data structure as represented by the copy relationships 42 of the memory 20 of FIG. 3. Thus, one or more copy relationships 42, which may be maintained by the mirror logic 28 for the primary and secondary storage controllers 4a, 4b, (FIG. 1) associate primary storage locations in the primary storage 10a and corresponding secondary storage locations in each of the secondary storage drives as represented by the storage 10b of the mirror relationship, such that updates to locations of the primary storage 10a are mirrored, that is, copied to the corresponding locations of the secondary storage 10b. For example, source storage locations in a primary storage volume1 (FIG. 1) of storage 10a may be asynchronously mirrored in a mirror operation to target storage locations of a secondary volume2 of the storage 10b pursuant to a mirror copy relationship 42 (FIG. 3). Similarly, source storage locations in the primary storage volume1 (FIG. 1) of storage 10a may be asynchronously mirrored in a mirror operation to additional target storage locations of another secondary volume2 of another secondary data storage system pursuant to a mirror copy relationship 42 (FIG. 3).

In the illustrated embodiment, a copy relationship of the copy relationships 42 comprises an asynchronous mirror relationship for a pair of storage locations in which updates to the primary (source) storage locations of the mirror relationship 42 are asynchronously mirrored to the secondary (target) storage locations of the mirror relationship 42. It is appreciated that other types of copy relationships such as synchronous, for example, may be established, depending upon the particular application.

Figure 4:
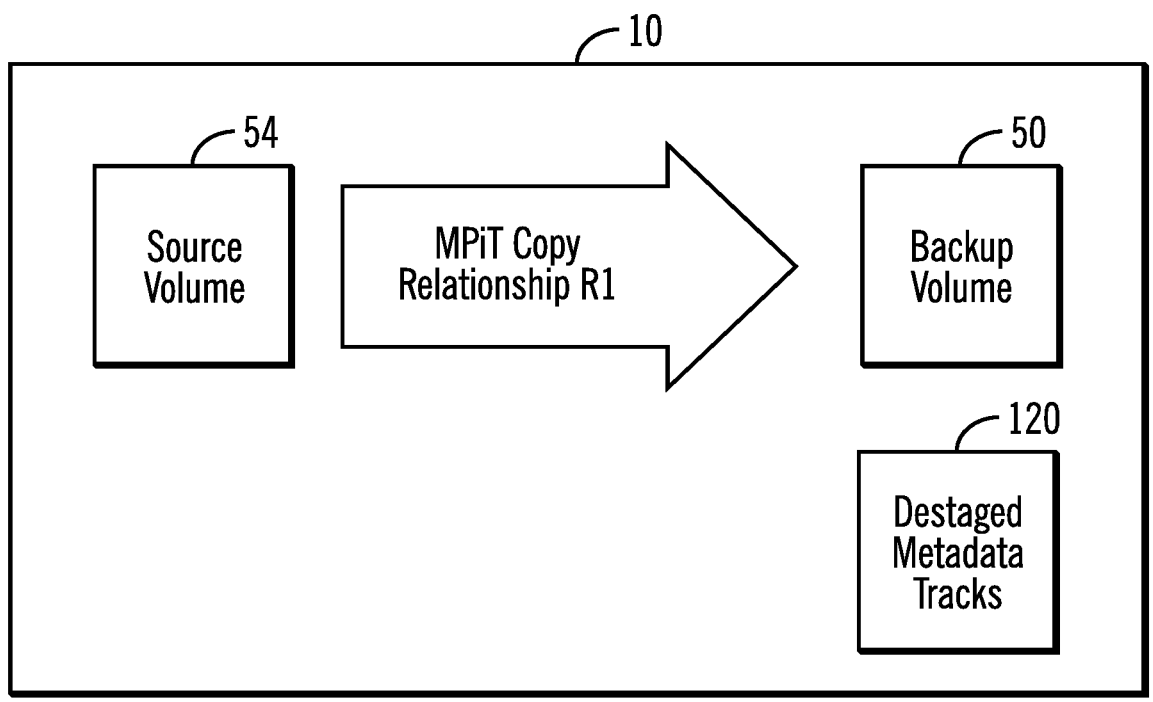
FIG. 4 illustrates an example of volumes stored in a data storage unit of the computing environment of FIG. 1.

In the illustrated embodiment, another copy relationship of the copy relationships 42 is a multi-point-in-time (MPiT) copy relationship. FIG. 4 depicts an example of an MPiT relationship R1 which provides in a backup volume 50 (FIG. 4) of storage 10, a copy of a source volume 54 which spans multiple consistency groups. A source volume 54 may be a primary volume such as the volume1 of the primary storage 10a, for example, or may be a secondary volume such as the volume2 of the secondary storage 10b, for example. However, it is appreciated that metadata track selection switching in accordance with the present description may be applied to a volume which is not in a mirroring relationship, as noted above.

An example of an MPiT copy relationship is provided by the IBM Safeguarded Copy function, for example. An MPiT copy function typically relies on metadata to provide information on where in the MPiT backup volume 50, a particular time version of a particular track of the source volume 54 of the MPiT copy function resides. This metadata is referred to herein as Source Track ID Descriptor or STIDD. Within the STIDD metadata are multiple metadata tracks for the MPiT backup volumes, and within each metadata track are multiple STIDD entries, each of which points to the location in a backup volume of a particular time version of a particular source track. Although one example of metadata track selection switching is described in connection with protecting volumes of an MPiT relationship, it is appreciated that metadata track selection switching in accordance with the present description may be used in connection with generation and journaling of metadata tracks for other types of copying functions such as PiT functions and any other function involving generation, journaling or destaging of metadata tracks. Thus, in one embodiment, metadata track selection switching in accordance with the present description is a stand-alone function as described above.

In one embodiment of the storage manager 24, update logic 104 of the storage manager 24 is configured to, if a track of an MPiT source volume 54 is to be updated with new data, to first copy the source track to be updated, to the MPiT backup volume 50 of the MPiT copy relationship R1 before the source track is overwritten with the new data. In one aspect of metadata track selection switching in accordance with the present description, as the update logic 104 copies data tracks from the source volume to the backup volume, the update logic 104 is further configured to cause a metadata logic 108 to generate a source track identification descriptor (STIDD) metadata entry for each copied track and place the generated metadata entries in a selected metadata track of multiple available metadata tracks 30 in the volatile cache 26a. FIGS. 5a and 6a depict examples of two available metadata tracks MT1 and MT2, respectively, in the volatile cache 26a. Each metadata track is a list of metadata entries such as the metadata entry ME101 of the metadata track MT1 of FIG. 5a, for example.

In one embodiment, each metadata entry is a data structure having multiple fields including a field which identifies by source track identification number, the source track to which it pertains and a field which identifies by target track identification number, the backup track of the backup volume to which the source track was copied before it was updated. In the illustrated embodiment, each metadata track such as the metadata track MT1 of FIG. 5a, is a linked list of metadata entries in which the entries are linked by pointers to form a sequence of metadata entries. Thus, in one embodiment, the fields of each metadata entry may include a pointer which points to the next-in-sequence entry of the list of metadata entries of the track. It is appreciated that the number and type of fields within a metadata entry and the sequential structure, if any, of the metadata track, may vary depending upon the particular application.

In one aspect of the present description, the metadata logic 108 is configured to select from multiple available metadata tracks in the volatile cache 26a, a metadata track such as the metadata track MT1, for example, to fill with STIDD metadata entries in a metadata track selection interval (FIG. 5A) as source tracks of a source volume 54 (FIG. 4) are copied to a backup volume 50 of an MPiT copy relationship R1. As metadata entries are generated and placed in the selected metadata track MT1 in the volatile cache for each of the copied source tracks, journal logic 110 is configured to create journal entries 34 corresponding to the generated STIDD metadata entries and store them in the non-volatile cache 26a.

In one aspect of the present description, the metadata logic 108 is further configured to switch selection of a metadata track from a first selected metadata track such as the metadata track MT1 (FIG. 5a) to a second metadata track such as the metadata track MT2 (FIG. 6a), for example. In this manner, the second metadata track MT2 becomes the current selected track and the first metadata track MT1 becomes deselected.

Destage logic 112 of the storage manager 24 is configured to destage the deselected first metadata track MT1 of generated metadata entries to metadata storage 120 of the storage 10 (FIG. 4) while the metadata logic 108 continues to generate additional source track identification descriptor (STIDD) metadata entries for each track of the source volume 54 being copied to the backup volume 50. However, at this point following the switch of the selected metadata track to the second metadata track MT2 (FIG. 4a), the generated metadata entries are placed in the second, selected metadata track MT2 in a second metadata track selection interval (FIG. 6A) instead of the first deselected metadata track MT1. As metadata entries are generated and placed in the selected metadata track MT2 in the volatile cache for each of the copied source tracks, journal logic 110 creates journal entries corresponding to the generated STIDD metadata entries of the second, selected metadata track MT2 and stores them in the non-volatile cache 26a. The journal logic 110 is also configured to release the portion of the journal entries 34 in the non-volatile cache 26a for the deselected metadata track MT1 upon completion of the destaging of the deselected metadata track MT1 to the metadata storage 120.

In this manner, the deselected track MT1 may be destaged to nonvolatile storage to ensure preservation of the metadata entries of the metadata track MT1 while new metadata entries continue to be generated and placed in the second, selected metadata track MT2 in the volatile cache in a metadata track selection interval as source tracks continue to be copied to the backup volume 50. As a result, a metadata track may be destaged to nonvolatile metadata storage 120 without causing a significant delay in the generation of new metadata entries in the volatile cache.

Moreover, the number of journal entries 111 in the nonvolatile cache may be reduced to reduce error recovery time should the journal entries be needed to reconstruct lost metadata entries without causing a significant adverse impact on system performance. Instead, because multiple metadata track selection switching in accordance with the present description permits a metadata track to be destaged to nonvolatile storage without causing a significant delay in the generation of new metadata entries in the volatile cache, the frequency of destaging operations may be increased to reduce the number of journal entries without causing a significant impact on system performance. Thus system designers are no longer faced with a tradeoff between reducing error recovery time by reducing the number of journal entries in cache, and a resultant cost of such error recovery time reduction in terms of reducing system performance.

At an appropriate time, the metadata logic 108 will again switch selection of the metadata tracks so that the first metadata track MT1 is again the selected metadata track and the second metadata track MT2 is again the deselected metadata track. In this manner, the deselected track MT2 may be destaged to nonvolatile storage to ensure preservation of the metadata entries of the metadata track MT2 while new metadata entries continue to be generated and placed in the first, selected metadata track MT1 in another MT1 track selection interval as source tracks continue to be copied to the backup volume. As metadata entries are generated and placed in the selected metadata track MT1 in the volatile cache in the MT1 track selection interval for each of the copied source tracks, journal logic 110 creates journal entries 34 corresponding to the generated STIDD metadata entries and store them in the nonvolatile cache. In addition, the journal logic 110 releases that portion of the journal entries 34 for the deselected metadata track MT2 in the nonvolatile cache upon completion of the destaging of the deselected metadata track MT2. Here too, metadata track selection switching in accordance with the present description permits a metadata track to be destaged to nonvolatile storage without causing a significant delay in the generation of new metadata entries in the volatile cache because metadata entries may be added to one track while the other track is being destaged and then switching the roles of the two tracks.

The metadata logic 108 is configured to store a cursor position pointing to a next track location of track MT1 as entry filling switches to the other track MT2. The stored cursor position may be used to locate entry filling in the track MT1 when entry filling resumes in track MT1. Similarly, the metadata logic 108 is configured to store a cursor position pointing to a next track location of track MT2 as entry filling switches back to the other track MT1. The stored cursor position may be used to locate entry filling in the track MT2 when entry filling resumes in track MT2.

The metadata logic 108 is further configured to switch selection of the metadata track from the metadata track MT1 to the other metadata track MT2 in response to the source track identification descriptor (STIDD) metadata entries being stored on the metadata track in a track selection interval reaching a predetermined limit less than the full capacity of the metadata track MT1, or the track MT1 becoming full, which ever occurs first. In a similar manner, the switching selection of a metadata track from the second metadata track MT2 back to the first metadata track MT1 occurs in response to the source track identification descriptor (STIDD) metadata entries stored on the second metadata track MT2 reaching during a track selection interval, a predetermined limit less than full capacity of the second metadata track MT2, or the second track becoming full, which ever occurs first. The switching back and forth between filling the first track MT1 and filling the second track MT2 continues until a track reaches full capacity. At that point, filling switches to a new track and switching resumes.

Although the illustrated embodiment of metadata track selection switching of the present description is described in connection with switching selection of tracks for entry filling in a back and forth sequence between two tracks, MT1 and MT2, it is appreciated that metadata track selection switching of the present description is applicable to switching selection of tracks for entry filling among multiple available tracks which may number more than two available at a time. Such selection switching may be done, for example, in a round robin selection sequence or any other selection sequence suitable to a particular application.

In the illustrated embodiment, the storage manager 24 including the metadata logic 108 and the destaging logic 112, is depicted as software stored in the memory 20 and executed by a processor of the CPU complex 18. However, it is appreciated that the logic functions of the storage manager 24 and its logic including the metadata logic 108 and the destaging logic 112 may be implemented as hardware, software, firmware or combinations of one or more thereof, depending upon the particular application.

In the configuration illustrated in FIG. 1, the storage controller 4a and the data storage 10a have been configured as a primary storage control unit and the primary storage, respectively, of a primary data storage system 2a. Similarly, the storage controller 4b and its data storage 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b. In this embodiment, there may be multiple secondary data storages such that a copy relation can be in a one to many relationship, which is also referred to as a multi-target relationship.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6. In the illustrated embodiment each of the data storage units 10, 10a, 10b include one or more nonvolatile storage drives.

It is appreciated that one or more data storage units of the storage 10, 10a, 10b may comprise any suitable device capable of storing data in a nonvolatile manner, such as hard drives, solid state drives, tape drives, etc., known in the art. Thus, in one embodiment, the storage 10, 10a, 10b may be comprised of one or more sequential access storage devices, such as hard disk drives and magnetic tape drives or may also include non-sequential access storage devices such as solid state drives (SSD), for example. Such additional devices of storage 10, 10a, 10b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 10a, 10b may also be other types of storage such as solid state drives in a RAID configuration to facilitate data recovery in the event of loss of a solid state drive. The storage units of the storage 10a, 10b may be configured to store data in subunits of data storage such as volumes, tracks, etc.

Figure 7:
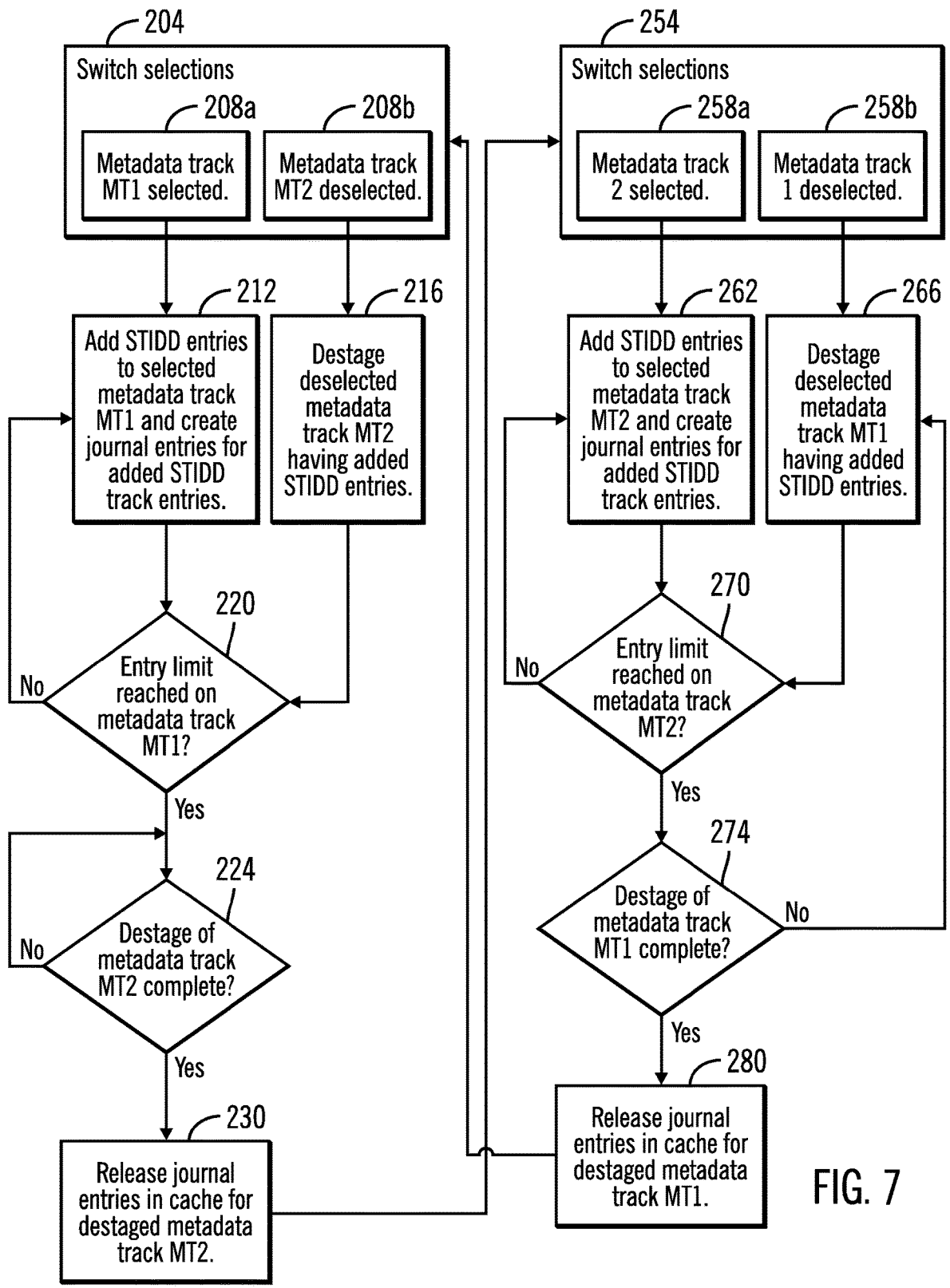
FIG. 7 illustrates an example of operations of a storage controller of the computing environment of FIG. 1, employing metadata track selection switching in accordance with one aspect of the present description.

FIG. 7 depicts one example of operations of a storage manager 24 (FIG. 3) employing metadata track selection switching in accordance with one embodiment of the present description. In this example, in connection with the update logic 104 copying source tracks of a source volume 54 to a backup volume 50 of an MPiT copy relationship R1 prior to updating the source tracks being copied, the metadata logic 108 in a selection switching operation (block 204, FIG. 7), selects (block 208a) the metadata track MT1 (FIG. 5a) in volatile cache 26a for a track selection interval I1 and deselects another metadata track MT2 (FIG. 6a) in volatile cache 26a, which track MT2 was previously selected and filled with metadata entries in a prior MT2 track selection interval I00 (FIG. 6A).

For the selected metadata track MT1, the metadata logic 108 adds (block 212, FIG. 7) in an MT1 track selection interval I1, new STIDD metadata entries to the selected metadata track MT1 for each source track of the source volume 54 copied to the backup volume 50 of the MPiT relationship R1. In addition, journal logic 110 creates journal entries for each added metadata entry and stores the new journal entries in the non-volatile cache 26a. Concurrently with the metadata operations of block 212 by the metadata logic 108, the destage logic 112 destages (block 216, FIG. 7) the deselected metadata track MT2 to the metadata storage 120 (FIG. 4) of the storage 10. The deselected metadata track MT2 was previously selected and filled in a prior MT2 track selection interval I0, with metadata entries as source tracks of the same source volume 54 were copied to the same backup volume 50 of the same MPiT copy relationship R1 of the metadata generation operation for the other metadata track MT1 of block 212. In this manner, the metadata entry creation (block 212) by the metadata logic 108 for the selected metadata track MT1 occurs in parallel with and substantially overlapping in time with the destaging operations by the destaging logic 112 for the deselected metadata track MT2. Thus, destaging of the metadata track MT2 does not delay the generation of metadata entries for the metadata track MT1 in connection with the same MPiT relationship R1.

In the illustrated embodiment, the metadata logic 108 initiates switching selections between the available metadata tracks MT1 and MT2 for the MPiT relationship R1 by imposing a limit on the number of metadata entries generated during the interval in which a particular metadata track is selected for filling with metadata entries. Thus, in the example of FIG. 7, the metadata logic 108 is configured to determine (block 220, FIG. 7) whether the predetermined limit of metadata entries during the selection interval I1 for the metadata track MT1 has been reached. If not, the metadata logic 108 continues to add (block 212, FIG. 7) new STIDD metadata entries to the selected metadata track MT1 for each source track of the source volume 54 copied to the backup volume 50 of the MPiT relationship R1, and journal logic 110 continues to create journal entries for each added metadata entry and store the new journal entries in the non-volatile cache 26a.

Once the metadata logic 108 determines (block 220, FIG. 7) that the predetermined limit of metadata entries during the selection interval I1 for the metadata track MT1 has been reached, the metadata logic also determines (block 224, FIG. 7) whether the destaging logic 112 has completed the concurrent destaging (block 216) of the deselected metadata entry MT2. Once the destaging of the deselected metadata track MT2 is complete, the journal logic 110 can release (block 230, FIG. 7) the journal entries in the non-volatile cache 26a corresponding to the successfully destaged metadata entries of the deselected metadata track MT2.

Upon completion of the metadata entry filling in the selected interval I1 of the metadata track MT1 and the completion of the destaging of the deselected metadata track MT2, the metadata logic 108 initiates another selection switching operation (block 254, FIG. 7), selects (block 258a) the metadata track MT2 (FIG. 5a) in volatile cache 26a and deselects (block 258b, FIG. 7) the metadata track MT1 (FIG. 6a) in volatile cache 26a, which track MT1 was previously selected and filled with metadata entries in a prior MT1 track selection interval I1 as described above. Alternatively, if the previously selected track MT2 has become full, another available track may be selected.

For the selected metadata track MT2, the metadata logic 108 adds (block 262, FIG. 7) in the MT2 selection interval I2, new STIDD metadata entries to the selected metadata track MT2 as additional source tracks of the source volume 54 are copied to the backup volume 50 of the MPiT relationship R1, and journal logic 110 creates journal entries for each added metadata entry and stores the new journal entries in the non-volatile cache 26a. Concurrently with the metadata operations of block 262 by the metadata logic 108, the destage logic 112 destages (block 266, FIG. 7) the deselected metadata track MT1 to the metadata storage 120. As noted above, the deselected metadata track MT1 was previously selected and filled with metadata entries in a prior MT1 track selection interval I1 as source tracks of the same source volume 54 were copied to the same backup volume 50 of the same MPiT copy relationship R1 of the metadata generation operation for the currently selected metadata track MT2 of block 262. In this manner, the metadata entry creation (block 262) by the metadata logic 108 for the currently selected metadata track MT2 in the MT2 track selection interval I2, occurs in parallel with and substantially overlapping in time with the destaging operations by the destaging logic 112 for the deselected metadata track MT1. Thus, destaging of the metadata track MT1 does not delay the generation of metadata entries for the metadata track MT2 in the MT2 track selection interval I2 in connection with the same MPiT relationship R1.

As noted above, in the illustrated embodiment, the metadata logic 108 initiates switching selections between the available metadata tracks MT2 and MT1 for the MPiT relationship R1 by imposing a limit on the number of metadata entries generated during the interval in which a particular metadata track is selected for filling with metadata entries. It is appreciated that other techniques may be employed to initiate switching between available metadata tracks including a track reaching full capacity, or imposing a time limit on track selection intervals and switching selection of metadata tracks upon reaching full capacity or expiration of the time limit, for example.

In the example of FIG. 7, the metadata logic 108 is configured to determine (block 270, FIG. 7) whether a predetermined limit of metadata entries during the selection interval I2 for the metadata track MT2 has been reached. If not, the metadata logic 108 continues to add (block 262, FIG. 7) new STIDD metadata entries to the selected metadata track for each additional source track of the source volume 54 copied to the backup volume 50 of the MPiT relationship R1, and journal logic 110 continues to create journal entries for each added metadata entry and store the new journal entries in the non-volatile cache 26a.

Once the metadata logic 108 determines (block 270, FIG. 7) that the predetermined limit of metadata entries for the metadata track MT2 has been reached in the current MT2 track selection interval I2, the metadata logic also determines (block 274, FIG. 7) whether the destaging logic 112 has completed the concurrent destaging (block 266) of the deselected metadata entry MT1. Once the destaging of the deselected metadata track MT1 is complete, the journal logic 110 can release (block 280, FIG. 7) the journal entries in the non-volatile cache 26a corresponding to the successfully destaged metadata entries of the deselected metadata track MT1.

Upon completion of the metadata entry filling in the selection interval I2 of the metadata track MT2 and the completion of the destaging of the deselected metadata track MT1, the metadata logic 108 initiates another selection switching operation (block 204, FIG. 7), selects (block 208a) the metadata track MT1 (FIG. 5a) in volatile cache 26a for another MT1 track selection interval I3 and deselects (block 208b) the metadata track MT2 (FIG. 6a) in volatile cache 26a, which track MT2 was previously selected and filled with metadata entries in a prior MT2 track selection interval I2 as described above. Alternatively, if the previously selected track MT1 has become full, another available track may be selected.

Figure 8:
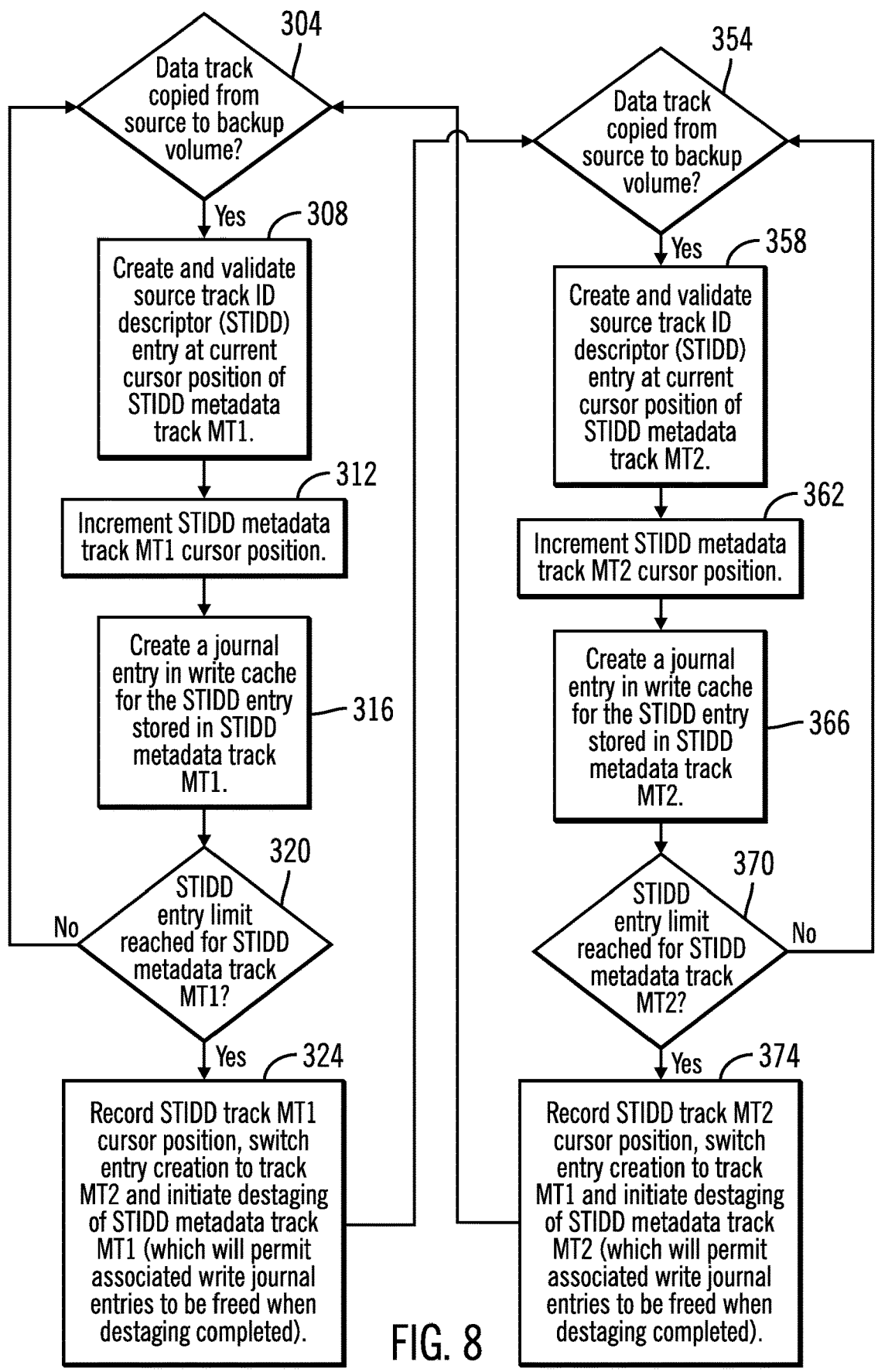
FIG. 8 illustrates a more detailed example of operations of a storage controller of the computing environment of FIG. 1, employing metadata track selection switching in accordance with one aspect of the present description.

FIG. 8 depicts a more detailed example of a storage manager 24 (FIG. 3) creating metadata and journal entries while employing metadata track selection switching in accordance with one embodiment of the present description. In this example, in connection with the update logic 104 copying source tracks of a source volume 54 to a backup volume 50 of an MPiT copy relationship R1 prior to updating the source tracks being copied, the metadata logic 108 in a selection switching operation initially selects the metadata track MT1 (FIG. 5a) in volatile cache 26a and deselects another metadata track MT2 (FIG. 6a) in volatile cache 26a, which track MT2 was previously selected and filled with metadata entries, in the manner described above in connection with FIG. 7. The metadata logic 108 detects (block 304, FIG. 8) whether the update logic 104 is copying another source track of the source volume 54 to the backup volume 50 of the MPiT copy relationship R1. If so, for the selected metadata track MT1, the metadata logic 108 adds (block 308, FIG. 8) in the MT1 track selection interval I1, a new STIDD metadata entry to the selected metadata track MT1 for the source track of the source volume 54 being copied to the backup volume 50 of the MPiT relationship R1.

Figure 9:
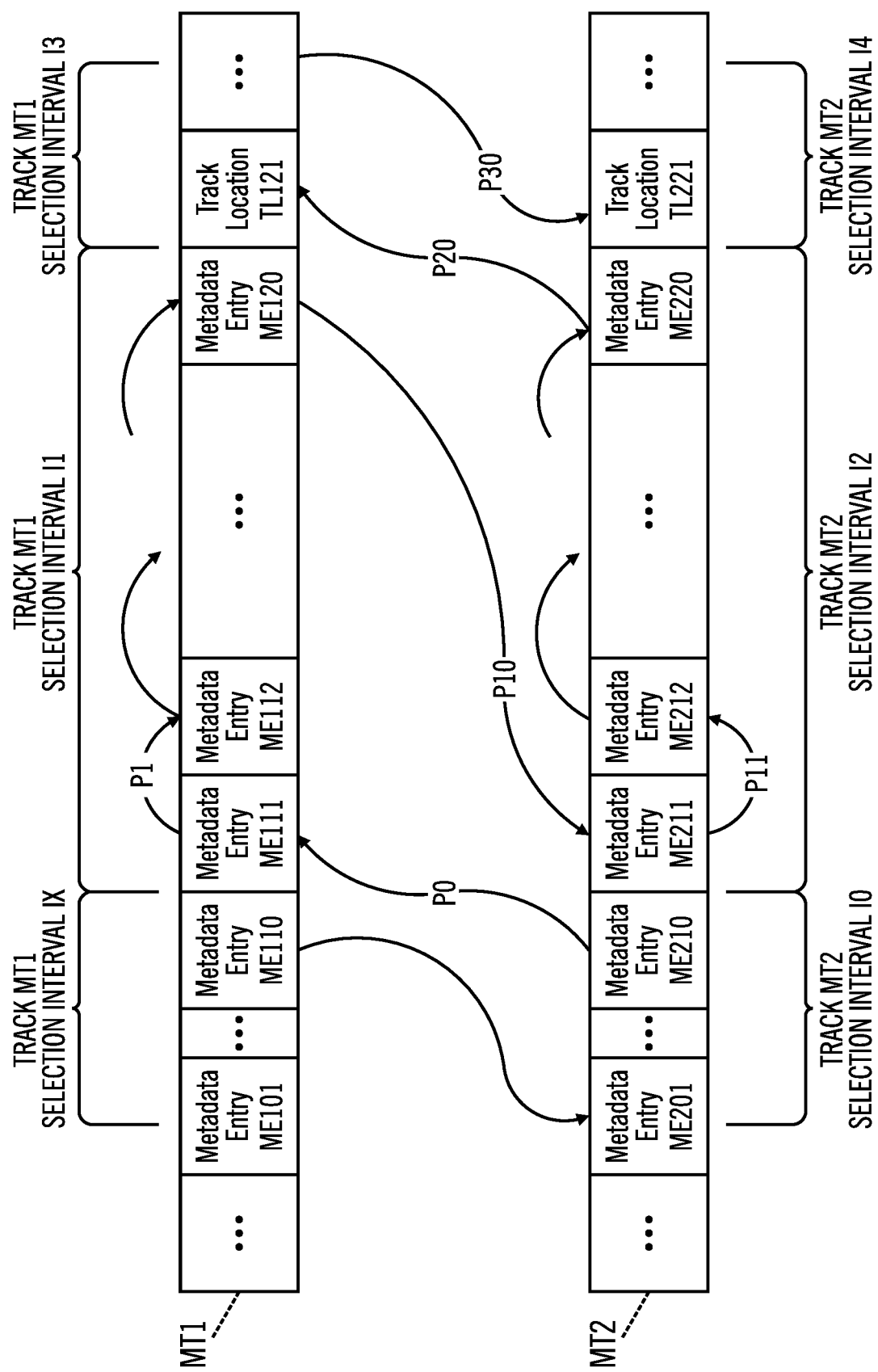
FIG. 9 illustrates selection switching between the metadata tracks of FIGS. 5A-5C and 6A-6C.

As shown in FIG. 5A, a cursor 310a is currently positioned to point to the track location TL111 of the metadata track MT1 in the MT1 selection interval I1 because the metadata logic 108 previously added ten metadata entries ME101, . . . ME110 to the previous ten metadata track locations in the prior selection interval IX of the metadata track MT1. The current cursor position TL111 was previously recorded in a cursor position memory 306 (FIG. 3) of the memory 20 by the metadata logic 108 at the conclusion of the prior selection interval IX of the metadata track MT1. Accordingly, the metadata logic 108 adds (block 308, FIG. 8) in the MT1 selection interval I1, the new STIDD metadata entry ME111 (FIG. 5B) to the current cursor position, metadata track location TL111, of the cursor 310a (FIG. 5A). The current cursor position is then incremented (block 312 (FIG. 8) to the next metadata track location, metadata track location TL112 as shown in FIG. 5B in preparation to receive the next metadata track entry in the MT1 selection interval I1. In one embodiment, the incremented cursor position may be recorded in a field of the new STIDD metadata entry ME111 as a link or pointer P1 (FIG. 9) to the next metadata entry (ME112) of the linked list of metadata entries of the metadata track MT1 for the backup volume 50 of the MPiT copy relationship R1. The journal logic 110 creates (block 316) a journal entry for the added metadata entry ME111 and stores the new journal entry in the non-volatile cache 26a.

Concurrently with the metadata and journal operations of blocks 308-316 in the MT1 selection interval I1 by the metadata logic 108 and journal logic 110, the destage logic 112 destages the deselected metadata track MT2 to the metadata storage 120. As noted above, the deselected metadata track MT2 was previously selected and filled with metadata entries in a prior MT2 track selection interval I0 as source tracks of the same source volume 54 were copied to the same backup volume 50 of the same MPiT copy relationship R1 of the metadata generation operation for the other metadata track MT1.

In the illustrated embodiment, a limit of ten metadata entries is imposed during each current metadata track selection interval. In this example, ten metadata entries is less than the full capacity of the metadata track. The number ten is selected for illustration purposes only and may vary, depending upon the particular application. It is appreciated that the smaller the limit on the number of metadata entries during each current metadata track selection interval, the smaller the number of journal entries stored and the greater the frequency of switching the filling of metadata tracks between available metadata tracks and the greater the frequency of destaging of the deselected metadata tracks. Thus, the number of journal entries stored in each current metadata track selection interval and the frequency of destaging operations of deselected metadata tracks, are each a function of the limit on the number of metadata entries generated and placed in a current metadata track selection interval.

Accordingly, the metadata logic 108 determines (block 320, FIG. 8) whether the STIDD metadata entry limit of ten entries has been reached for the current metadata track selection interval I1 for metadata track MT1. If not, the metadata logic 108 and the journal logic 110 continue to create metadata entries and associated journal entries, respectively, in the selection interval I1 for the selected metadata track MT1 and increment the cursor position of the cursor 310a until the metadata track entry limit is reached.

Once the metadata logic 108 determines (block 320, FIG. 8) that the predetermined limit of ten metadata entries has been reached during the current selection interval I1 for the metadata track MT1, ten metadata track entries ME111-120 will have been generated and placed in the corresponding metadata track locations TL111-TL120 in the volatile cache 26a and the cursor 310a will have been incremented to the metadata track location TL121 as shown in FIG. 5C. The current cursor position TL121 is recorded (block 324, FIG. 8) at the conclusion of the MT1 selection interval I1 in cursor position memory 306 by the metadata logic 108 which initiates another selection switching operation in which the metadata logic 108 selects the metadata track MT2 (FIG. 6a) in volatile cache 26a for MT2 selection interval I2 and deselects the metadata track MT1 (FIG. 5C) in volatile cache 26a, which track MT1 was previously selected and filled with ten metadata entries as described above. Once the destaging of the deselected metadata track is complete, the journal logic 110 can release the journal entries in the non-volatile cache 26a corresponding to the successfully destaged metadata entries of the deselected metadata track.

As described above in connection with FIG. 7 the metadata logic 108 in another selection switching operation selects the metadata track MT2 (FIG. 6A) in volatile cache 26a for the MT2 selection interval I2 and deselects the other metadata track MT1 (FIG. 5C) in volatile cache 26a, which track MT1 was previously selected and filled in a prior MT1 track selection interval I1 with ten metadata entries as described above The metadata logic 108 detects (block 354, FIG. 8) whether the update logic 104 is copying another source track of the source volume 54 to the backup volume 50 of the MPiT copy relationship R1. If so, for the selected metadata track MT2, the metadata logic 108 adds (block 358, FIG. 8) in the MT2 selection interval I2, a new STIDD metadata entry to the selected metadata track MT2 for the source track of the source volume 54 being copied to the backup volume 50 of the MPiT relationship R1.

As shown in FIG. 6A, a cursor 310b is currently positioned in the MT2 selection interval I2 to point to the track location TL211 of the metadata track MT2 because the metadata logic 108 previously added ten metadata entries ME201, . . . ME210 to the previous ten metadata track locations in the prior selection interval I0 of the metadata track MT2. The current cursor position TL211 was previously recorded by the metadata logic 108 at the conclusion of the prior selection interval I0 of the metadata track MT2. Accordingly, the metadata logic 108 adds (block 358, FIG. 8) the new STIDD metadata entry ME211 (FIG. 6B) to the current cursor position, metadata track location TL211, of the cursor 310b (FIG. 6A).

In one aspect of metadata track selection switching in accordance with the present description, the current cursor position TL211 for the metadata track MT2 may be stored in a field of the last entered STIDD metadata entry ME120 of the metadata track MT1 as a pointer P10 (FIG. 9) to the next metadata entry of the linked list which is metadata track entry ME211 of the metadata track MT2 to continue the linked list of metadata entries for the backup volume 50 of the MPiT copy relationship R1 from the point at which the linked list of metadata entries of MT1 selection interval I1 ended on metadata track MT1 and restarted for the metadata entries of MT2 selection interval I2 on metadata track MT2. In this manner, the linked list of metadata entries for the backup volume 50 of the MPiT copy relationship R1 switches back and forth between the metadata tracks MT1 and MT2 as the selection intervals switch back and forth between the metadata tracks MT1 and MT2.

The current cursor position of the metadata track MT2 is then incremented (block 362 FIG. 8) to the next metadata track location, metadata track location TL212 as shown in FIG. 6B in preparation to receive the next metadata track entry. In one embodiment, the incremented cursor position TL212 may be recorded in a field of the new STIDD metadata entry ME211 as a pointer P11 (FIG. 9) to the next metadata entry of the linked list of metadata entries for the backup volume 50 of the MPiT copy relationship R1. The journal logic 110 creates (block 366) a journal entry for the added metadata entry ME211 and stores the new journal entry in the non-volatile cache 26a.

Concurrently with the metadata and journal operations of blocks 358-366 in MT2 selection interval I2, by the metadata logic 108 and journal logic 110, the destage logic 112 destages the deselected metadata track MT1 to the metadata storage 120. As noted above, the deselected metadata track MT1 was previously selected and filled in a prior MT1 track selection interval I1 with ten metadata entries ME111-ME120 (FIG. 5C) as source tracks of the same source volume 54 were copied to the same backup volume 50 of the same MPiT copy relationship R1 of the metadata generation operation for the other metadata track MT2.

As previously mentioned, in the illustrated embodiment, a limit of ten metadata entries is imposed during each current metadata track selection interval. Accordingly, the metadata logic 108 determines (block 370, FIG. 8) whether the STIDD metadata entry limit of ten entries has been reached for the current metadata track selection interval I2 for metadata track MT2. If not, the metadata logic 108 and the journal logic 110 continue to create metadata entries and associated journal entries, respectively, for the selected metadata track MT2 and increment the cursor position of the cursor 310b in the current MT2 selection interval I2 until the metadata track entry limit is reached, or the track MT2 is filled to capacity, which ever occurs first.

Once the metadata logic 108 determines (block 370, FIG. 8) that the predetermined limit of ten metadata entries has been reached during the current selection interval I2 for the metadata track MT2, ten metadata track entries ME211-220 will have been generated and placed in the corresponding metadata track locations TL211-TL220 of the metadata track MT2 in the volatile cache 26a and the cursor 310b will have been incremented to the metadata track location TL221 as shown in FIG. 6C. The current cursor position TL221 is recorded (block 374, FIG. 8) in cursor position memory 306 by the metadata logic 108 at the conclusion of MT2 selection interval I2 and initiates another selection switching operation in which the metadata logic 108 selects the metadata track MT1 (FIG. 5C) in volatile cache 26a for another MT1 selection interval, that is, selection interval I3, and deselects the metadata track MT2 (FIG. 6C) in volatile cache 26a, which track MT2 was previously selected and filled with ten metadata entries as described above. Once the destaging of the deselected metadata track MT2 is complete, the journal logic 110 can release the journal entries in the non-volatile cache 26a corresponding to the successfully destaged metadata entries of the deselected metadata track MT2.

Thus, upon completion of the metadata entry filling in the selection interval I2 of the metadata track MT2 and the completion of the destaging of the deselected metadata track MT1, the metadata logic 108 initiates another selection switching operation which again selects the metadata track MT1 (FIG. 5C) in volatile cache 26a for another MT1 track selection interval, selection interval I3, and deselects the other metadata track MT2 (FIG. 6C) in volatile cache 26a, which track MT2 was previously selected and filled with ten metadata entries ME211-ME220 in the manner described above in MT2 selection interval I2. The metadata logic 108 detects (block 304, FIG. 8) whether the update logic 104 is copying another source track of the source volume 54 to the backup volume 50 of the MPiT copy relationship R1. If so, for the selected metadata track MT1, the metadata logic 108 adds (block 308, FIG. 8) in the MT1 selection interval I3, a new STIDD metadata entry to the selected metadata track MT1 for the source track of the source volume 54 being copied to the backup volume 50 of the MPiT relationship R1.

As shown in FIG. 5C, the cursor 310a is currently positioned to point to the track location TL121 of the metadata track MT1 because the metadata logic 108 previously added in the prior MT1 track selection interval I1, ten metadata entries ME111, ME112, . . . ME120 to the previous ten metadata track locations in the prior selection interval I1 of the metadata track MT1. As described above, the current cursor position TL121 was previously recorded by the metadata logic 108 at the conclusion of the prior selection interval I1 of the metadata track MT1. Accordingly, the metadata logic 108 adds (block 308, FIG. 8) in the MT1 selection interval I3, the new STIDD metadata entry (not shown) to the current cursor position, metadata track location TL121, of the cursor 310a (FIG. 5C).

In one aspect of metadata track selection switching in accordance with the present description, the current cursor position TL121 for the metadata track MT1 may be stored in a field of the last entered STIDD metadata entry ME220 of the metadata track MT2 as a pointer P20 (FIG. 9) to the next metadata entry of the linked list which is metadata track entry ME121 (not shown) of the metadata track location TL121 of the metadata track MT1 to continue the linked list of metadata entries for the backup volume 50 of the MPiT copy relationship R1 from the point at which the linked list of metadata entries ended on metadata track MT2 in MT2 selection interval I2 and restarted on metadata track MT1 in MT1 selection interval I3. In a similar manner, upon conclusion of the metadata entry filling in the MT1 selection interval I3 and the beginning of the next MT2 track selection interval I4, the current cursor position for the metadata track MT2 may be stored in a field of the last entered STIDD metadata entry of the metadata track MT1 as a pointer P30 (FIG. 9) to the next metadata entry of the linked list which is a metadata track entry of the metadata track MT2 to continue in the next selection interval I4, the linked list of metadata entries for the backup volume 50 of the MPiT copy relationship R1 from the point at which the linked list of metadata entries ended on metadata track MT1 in MT1 selection interval I3 and restarted on metadata track MT2 in MT2 selection interval I4. In this manner, the linked list of metadata entries for the backup volume 50 of the MPiT copy relationship R1 switches back and forth between the metadata tracks MT1 and MT2 in a sequence . . . I0, I1, I2, I3, I4 . . . of back and forth selection interval switches, until the metadata tracks MT1 and MT2 are filled to capacity and destaged a last time. Once a metadata track is filled with metadata entries to the full capacity of the metadata track, another available metadata track having spare capacity is selected for filling and metadata track selection switching in accordance with the present description resumes for the new track or tracks. It is appreciated that the capacity of any one metadata track may vary, depending upon the particular application.

The storage manager 24 (FIG. 2) in one embodiment stores data in the cache and transfers data between the cache and storage 10, 10a, 10b (FIG. 1) in tracks. Similarly, the storage manager 24 (FIG. 2) in one embodiment transfers data from the primary storage 10a (FIG. a) to a secondary storage 10b in tracks. As used herein in one embodiment, the term track refers to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Accordingly, the size of subunits of data processed in input/output operations in accordance with the present description may vary, depending upon the particular application. Thus, as used herein, the term "track" refers to any suitable subunit of data caching, storage or transfer.

The system components 1a (FIG. 1), 1b . . . 1n, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 10:
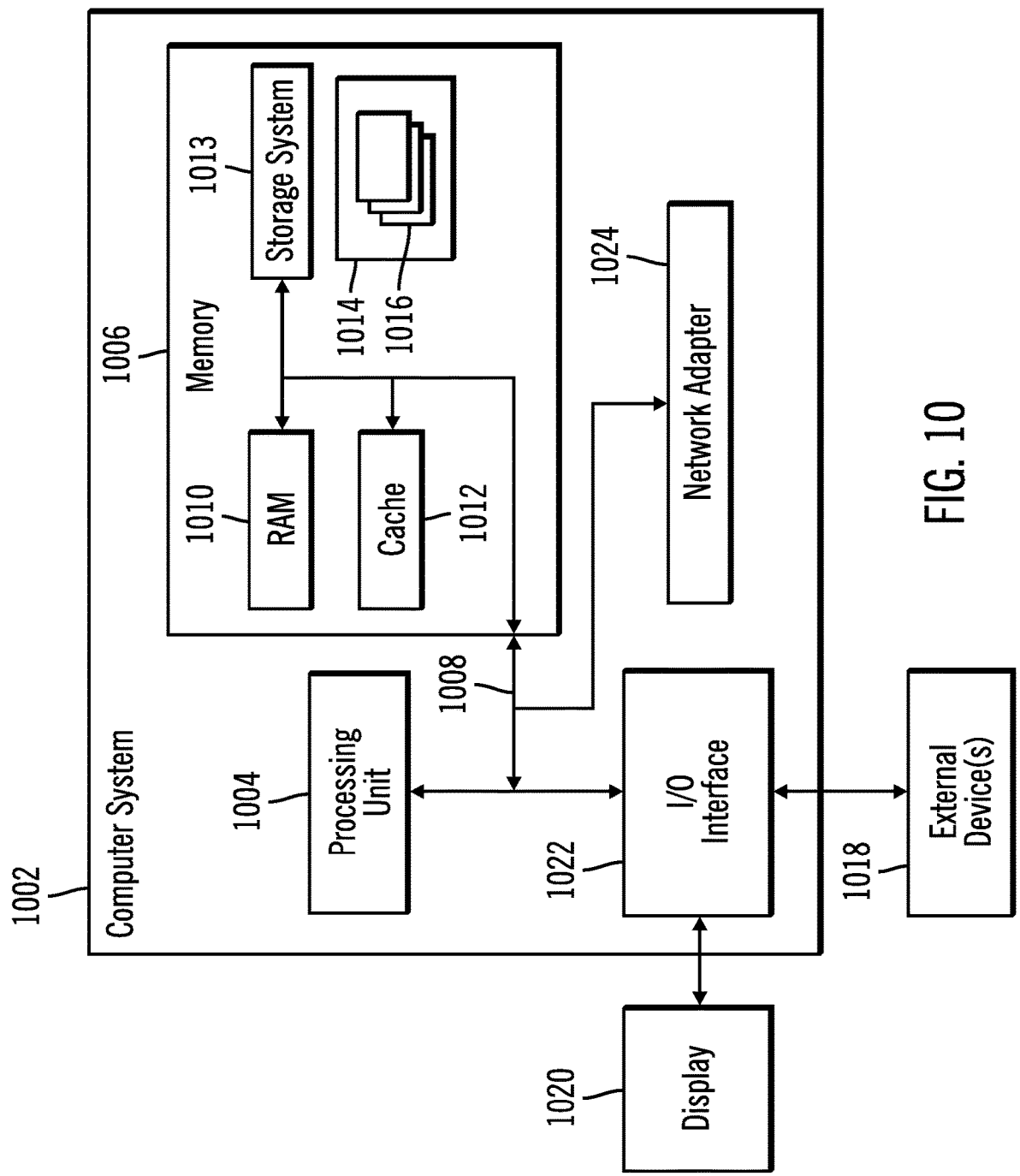
FIG. 10 illustrates a computer embodiment employing metadata track selection switching in a data storage system in accordance with the present description.

The computational components of the figures may each be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a data storage system having a storage controller and at least one storage unit controlled by the storage controller, wherein the storage controller has a processor and a cache, and wherein the computer program product comprises a non-transitory computer readable storage medium having program instructions embodied therewith, the program instructions executable by a processor of the storage controller to cause storage controller processor operations, the storage controller processor operations comprising:

copying data tracks from a source volume of the storage unit to a backup volume of the storage unit; and writing metadata entries to a plurality of metadata tracks in a selection sequence alternating among selected metadata tracks of the cache to provide a linked list of metadata entries of the alternating sequence of selected metadata tracks, including:

generating a first plurality of source track identification descriptor (STIDD) metadata entries for each of a first plurality of copied tracks and storing the first plurality of generated metadata entries in a first selection interval of a sequence of selection intervals, in a selected first metadata track of the cache;

switching selection of a metadata track from the first metadata track to a second metadata track of the cache wherein the second metadata track is the selected track in a second selection interval of the sequence of selection intervals and the first metadata track is deselected; and destaging the deselected first metadata track storing the first plurality of generated metadata entries from the cache to the storage unit, while generating a second plurality of source track identification descriptor (STIDD) metadata entries for each of a second plurality of copied tracks and storing the second plurality of generated metadata entries in the second selection interval in the selected second metadata track of the cache;

wherein the linked list of metadata entries is linked by pointers of the metadata entries of the first and second metadata tracks in which a pointer of a metadata entry of the first metadata track points to a metadata entry of the second metadata track.

2. The computer program product of claim 1 wherein the storage controller processor operations further comprise:

switching selection of a metadata track from the second metadata track back to the first metadata track wherein the first metadata track is again selected in a third selection interval of the sequence of selection intervals and the second metadata track is deselected; and destaging the deselected second metadata track storing the second plurality of generated metadata entries from the cache to the storage unit while generating a third plurality of source track identification descriptor (STIDD) metadata entries for each of a third plurality of copied tracks and resuming storing in the selected first metadata track of the cache including storing the third plurality of generated metadata entries in the third selection interval of the sequence of selection intervals, in the selected first metadata track of the cache.

3. The computer program product of claim 2 wherein the storage controller processor operations further comprise incrementing a position of a cursor pointing to a STIDD metadata entry position of the selected first metadata track as STIDD metadata entries are stored in the selected first metadata track and storing a current position of the cursor in connection with deselecting the first metadata track.

4. The computer program product of claim 3 wherein the storing the third plurality of generated metadata entries in the third selection interval in the selected first metadata track is initiated at an STIDD metadata entry position of the selected first metadata track pointed to by the stored cursor position.

5. The computer program product of claim 2 wherein the storage controller processor operations further comprise creating in the cache a first plurality of journal entries corresponding to the generated first plurality of source track identification descriptor (STIDD) metadata entries for each of the first plurality of copied tracks and releasing from the cache, the first plurality of journal entries upon completion of the destaging of the deselected first metadata track.

6. The computer program product of claim 5 wherein the storage controller processor operations further comprise creating in the cache a second plurality of journal entries corresponding to the generated second plurality of source track identification descriptor (STIDD) metadata entries for each of the second plurality of copied tracks and releasing from the cache the second plurality of journal entries upon completion of the destaging of the deselected second metadata track.

7. The computer program product of claim 2 wherein the switching selection of a metadata track from the first metadata track to the second metadata track occurs in response to the first plurality of source track identification descriptor (STIDD) metadata entries stored on the first metadata track reaching in the first selection interval, the earlier of a predetermined limit which is less than full capacity of the first metadata track, and the full capacity of the first metadata track; and wherein the switching selection of a metadata track from the second metadata track to the first metadata track occurs in response to the second plurality of source track identification descriptor (STIDD) metadata entries stored on the second metadata track reaching in the second selection interval, the earlier of a predetermined limit which is less than full capacity of the second metadata track, and the full capacity of the second metadata track.

8. A system, comprising:

a data storage system having a storage controller and at least one storage unit controlled by the storage controller and configured to store data in volumes, wherein the storage controller has a processor and a cache; and a computer program product comprising a non-transitory computer readable storage medium having program instructions embodied therewith, the program instructions executable by a processor of the storage controller to cause storage controller processor operations, the storage controller processor operations comprising:

copying data tracks from a source volume of the storage unit to a backup volume of the storage unit; and writing metadata entries to a plurality of metadata tracks in a selection sequence alternating among selected metadata tracks of the cache to provide a linked list of metadata entries of the alternating sequence of selected metadata tracks, including:

generating a first plurality of source track identification descriptor (STIDD) metadata entries for each of a first plurality of copied tracks and storing the first plurality of generated metadata entries in a first selection interval of a sequence of selection intervals in a selected first metadata track of the cache;

switching selection of a metadata track from the first metadata track to a second metadata track of the cache wherein the second metadata track is the selected track in a second selection interval of the sequence of selection intervals and the first metadata track is deselected; and destaging the deselected first metadata track storing the first plurality of generated metadata entries from the cache to the storage unit, while generating a second plurality of source track identification descriptor (STIDD) metadata entries for each of a second plurality of copied tracks and storing the second plurality of generated metadata entries in the second selection interval in the selected second metadata track of the cache;

wherein the linked list of metadata entries is linked by pointers of the metadata entries of the first and second metadata tracks in which a pointer of a metadata entry of the first metadata track points to a metadata entry of the second metadata track.

9. The system of claim 8 wherein the storage controller processor operations further comprise:

switching selection of a metadata track from the second metadata track back to the first metadata track wherein the first metadata track is again selected in a third selection interval of the sequence of selection intervals and the second metadata track is deselected; and destaging the deselected second metadata track storing the second plurality of generated metadata entries from the cache to the storage unit while generating a third plurality of source track identification descriptor (STIDD) metadata entries for each of a third plurality of copied tracks and resuming storing in the selected first metadata track of the cache including storing the third plurality of generated metadata entries in the third selection interval of the sequence of selection intervals in the selected first metadata track of the cache.

10. The system of claim 9 wherein the storage controller processor operations further comprise incrementing a position of a cursor pointing to a STIDD metadata entry position of the selected first metadata track as STIDD metadata entries are stored in the selected first metadata track and storing a current position of the cursor in connection with deselecting of the first metadata track.

11. The system of claim 10 wherein the storing the third plurality of generated metadata entries in the selected first metadata track is initiated at an STIDD metadata entry position of the selected first metadata track pointed to by the stored cursor position.

12. The system of claim 9 wherein the storage controller processor operations further comprise creating in the cache a first plurality of journal entries corresponding to the generated first plurality of source track identification descriptor (STIDD) metadata entries for each of the first plurality of copied tracks and releasing from the cache, the first plurality of journal entries upon completion of the destaging of the deselected first metadata track.

13. The system of claim 12 wherein the storage controller processor operations further comprise creating in the cache a second plurality of journal entries corresponding to the generated second plurality of source track identification descriptor (STIDD) metadata entries for each of the second plurality of copied tracks and releasing from the cache the second plurality of journal entries upon completion of the destaging of the deselected second metadata track.

14. The system of claim 9 wherein the switching selection of a metadata track from the first metadata track to the second metadata track occurs in response to the first plurality of source track identification descriptor (STIDD) metadata entries stored on the first metadata track reaching in the first selection interval, the earlier of a predetermined limit less than full capacity of the first metadata track, and the full capacity of the first metadata track; and wherein the switching selection of a metadata track from the second metadata track to the first metadata track occurs in response to the second plurality of source track identification descriptor (STIDD) metadata entries stored on the second metadata track reaching in the second selection interval, the earlier of a predetermined limit less than full capacity of the second metadata track, and the full capacity of the second metadata track.

15. A method, comprising:

copying data tracks from a source volume to a backup volume; and writing metadata entries to a plurality of metadata tracks in a selection sequence alternating among selected metadata tracks of a cache to provide a linked list of metadata entries of the alternating sequence of selected metadata tracks, including:

generating a first plurality of source track identification descriptor (STIDD) metadata entries for each of a first plurality of copied tracks and storing the first plurality of generated metadata entries in a first selection interval of a sequence of selection intervals, in a selected first metadata track;

switching selection of a metadata track from the first metadata track to a second metadata track wherein the second metadata track is the selected track in a second selection interval of the sequence of selection intervals, and the first metadata track is deselected; and destaging the deselected first metadata track storing the first plurality of generated metadata entries to storage, while generating a second plurality of source track identification descriptor (STIDD) metadata entries for each of a second plurality of copied tracks and storing the second plurality of generated metadata entries in the second selection interval in the selected second metadata track;

wherein the linked list of metadata entries is linked by pointers of the metadata entries of the first and second metadata tracks in which a pointer of a metadata entry of the first metadata track points to a metadata entry of the second metadata track.

16. The method of claim 15 further comprising:

switching selection of a metadata track from the second metadata track back to the first metadata track wherein the first metadata track is again selected in a third selection interval of the sequence of selection intervals, and the second metadata track is deselected; and destaging the deselected second metadata track storing the second plurality of generated metadata entries while generating a third plurality of source track identification descriptor (STIDD) metadata entries for each of a third plurality of copied tracks and resuming storing in the selected first metadata track of the cache including storing the third plurality of generated metadata entries of the sequence of selection intervals, in the selected first metadata track.

17. The method of claim 16 further comprising incrementing a position of a cursor pointing to a STIDD metadata entry position of the selected first metadata track as STIDD metadata entries are stored in the selected first metadata track and storing a current position of the cursor in connection with deselecting the first metadata track.

18. The method of claim 17 wherein the storing the third plurality of generated metadata entries in the selected first metadata track is initiated at an STIDD metadata entry position of the selected first metadata track pointed to by the stored cursor position.

19. The method of claim 16 further comprising creating a first plurality of journal entries corresponding to the generated first plurality of source track identification descriptor (STIDD) metadata entries for each of the first plurality of copied tracks and releasing the first plurality of journal entries upon completion of the destaging of the deselected first metadata track.

20. The method of claim 19 further comprising creating a second plurality of journal entries corresponding to the generated second plurality of source track identification descriptor (STIDD) metadata entries for each of the second plurality of copied tracks and releasing the second plurality of journal entries upon completion of the destaging of the deselected second metadata track.

21. The method of claim 16 wherein the switching selection of a metadata track from the first metadata track to the second metadata track occurs in response to the first plurality of source track identification descriptor (STIDD) metadata entries stored on the first metadata track reaching a predetermined limit less than full capacity of the first metadata track and occurs again in response to the metadata entries reaching the full capacity of the first metadata track; and wherein the switching selection of a metadata track from the second metadata track to the first metadata track occurs in response to the second plurality of source track identification descriptor (STIDD) metadata entries stored on the second metadata track reaching a predetermined limit less than full capacity of the second metadata track and occurs again in response to the metadata entries reaching the full capacity of the second metadata track.

* * * * *